(12) United States Patent
Tsujimoto et al.

(10) Patent No.: US 8,862,397 B2
(45) Date of Patent: Oct. 14, 2014

(54) ARTICLE TRANSPORT FACILITY

(71) Applicant: Daifuku Co., Ltd., Osaka (JP)

(72) Inventors: Masanori Tsujimoto, Tokyo (JP);
Yoshimasa Hara, Tokyo (JP); Natsuo Takagawa, Gamo-gun (JP); Toshisada Mariyama, Gamo-gun (JP); Koji Kubota, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 13/859,233

(22) Filed: Apr. 9, 2013

(65) Prior Publication Data

US 2013/0275045 A1 Oct. 17, 2013

(30) Foreign Application Priority Data

Apr. 11, 2012 (JP) .................................. 2012-090590
Mar. 8, 2013 (JP) .................................. 2013-047060

(51) Int. Cl.
*G08G 1/16* (2006.01)
*B60P 1/00* (2006.01)

(52) U.S. Cl.
CPC .. *G08G 1/164* (2013.01); *B60P 1/00* (2013.01)
USPC ........................................................ 701/517

(58) Field of Classification Search
USPC ............. 701/23–27, 300, 301, 408–411, 517; 104/26.2, 295, 300; 198/322, 323
See application file for complete search history.

(56) References Cited

U.S. PATENT DOCUMENTS

| | | | | |
|---|---|---|---|---|
| 6,324,462 B1 * | 11/2001 | Kageyama | ....................... | 701/93 |
| 6,347,266 B1 * | 2/2002 | Kageyama | ....................... | 701/25 |
| 7,711,446 B2 * | 5/2010 | Taguchi et al. | ............... | 700/112 |
| 8,322,287 B2 * | 12/2012 | Oguro et al. | ..................... | 104/91 |
| 2005/0090950 A1 * | 4/2005 | Sawamoto et al. | ............. | 701/23 |
| 2012/0139715 A1 * | 6/2012 | Yamazato | ..................... | 340/436 |
| 2013/0006464 A1 * | 1/2013 | Speiser | ........................... | 701/25 |

FOREIGN PATENT DOCUMENTS

JP 2006259877 A 9/2006

* cited by examiner

*Primary Examiner* — James Trammell
*Assistant Examiner* — Rodney Butler
(74) *Attorney, Agent, or Firm* — The Webb Law Firm

(57) ABSTRACT

Disclosed is an article transport facility in which interference between an article transport vehicle and an interfering object is prevented. A position detector is provided on the ground side for detecting the position of an interfering object, and an external managing device issues a deceleration command to the article transport vehicle if the distance from the article transport vehicle to the interfering object becomes less than or equal to a predetermined low speed distance, based on position information for the interfering object and travel position information for the article transport vehicle. A vehicle side travel controller changes a target travel speed from a normal travel speed to a reduced travel speed which is lower, or less, than the normal travel speed while the target travel speed is set to the normal travel speed, if the deceleration command is issued from the external managing device.

22 Claims, 12 Drawing Sheets

ARTICLE TRANSPORT FACILITY

FIELD OF THE INVENTION

The present invention relates to an article transport facility comprising an article transport vehicle configured to travel by an operation of a travel actuating device and along a travel path extending by way of a plurality of article transfer locations; a ground side travel controller which issues a travel command to the article transport vehicle wherein the article transport vehicle has a vehicle side travel controller which controls operation of the travel actuating device based on detected information from a travel position detector which detects a travel position of the article transport vehicle, wherein the vehicle side travel controller is configured to control operation of the travel actuating device based on travel position information detected by the travel position detector and travel command information from the ground side travel controller in order to cause the article transport vehicle to travel along the travel path toward a target travel position at a target travel speed.

BACKGROUND

Facilities such as the article transport facility described above are configured to cause article transport vehicles to travel based on travel commands from a ground side travel controller to transport articles among article transfer locations with the article transport vehicles.

And an example of such article transport facility is disclosed in JP Publication of Application No. 2006-259877 (Patent Document 1).

In Patent Document 1, an obstacle sensor for detecting the position of an article is provided to each article transport vehicle.

And a vehicle side travel controller is configured to change the target travel speed to a reduced travel speed which is less than the normal travel speed when an article exists within a set distance from the article transport vehicle, based on detected information for the obstacle sensor.

Incidentally, in the conventional article transport facility described above, articles may be placed directly on the floor at a side of the travel path.

The positions of such articles are stored in advance in the vehicle side travel controller so that they would not be determined to be interfering objects or obstacles.

However, in the article transport facility disclosed in the Patent Document 1 described above, the obstacle sensor provided to the article transport vehicle detects the position of any interfering objects.

Thus, for example, if there is an article, such as an article that is directly placed on the floor, between an article transport vehicle and an interfering object, and if that article is not a target of detection and thus is not determined to be an interfering object, then because the interfering object can be hidden by this article that is not a target of detection, the obstacle sensor would not be able to detect the interfering object.

And if the interfering object is a movable object such as a human worker, etc., the interfering object may move and appear suddenly in front of the article transport vehicle.

And when this happens, the interfering object can be detected by the obstacle sensor only after the interfering object appears in front of the article a transport vehicle.

Thus, the article transport vehicle would be traveling at a normal travel speed when the interfering object sensor detects an interfering object; thus, there is a possibility that the article transport vehicle may interfere, or collide, with the interfering object before the vehicle is able to slow down and stop.

SUMMARY OF THE INVENTION

In light of the state of art described above, an article transport facility is desired that can properly detect interfering objects and that makes it easier to avoid interference between article transport vehicles and interfering objects.

An article transport facility in accordance with the present invention comprises:

an article transport vehicle configured to travel by an operation of a travel actuating device and along a travel path extending by way of a plurality of article transfer locations;

a ground side travel controller which issues a travel command to the article transport vehicle;

a vehicle side travel controller which is provided to the article transport vehicle, and which controls operation of the travel actuating device based on detected information from a travel position detector which detects a travel position of the article transport vehicle, wherein the vehicle side travel controller is configured to control operation of the travel actuating device based on travel position information detected by the travel position detector and travel command information from the ground side travel controller in order to cause the article transport vehicle to travel along the travel path toward a target travel position at a target travel speed;

a position detector provided on a ground side for detecting a position of an interfering object that exists in a detection target area which includes an area in which the travel path is installed; and an external managing device which issues a deceleration command to the article transport vehicle if and when the position of the interfering object with respect to the article transport vehicle is in a low speed area, which is defined in advance with respect to the position of the article transport vehicle, based on position information of the interfering object from the position detector and travel position information of the article transport vehicle;

wherein the vehicle side travel controller is configured to change the target travel speed from the normal travel speed to a reduced travel speed which is less than the normal travel speed if and when the deceleration command is issued from the external managing device while the target travel speed is set to the normal travel speed.

With the above-described arrangement, since the position detector is located on the ground side and not on the article transport vehicle, the position detector can be provided so as to be able to detect an interfering object that is located at a position which is hard to detect from the article transport vehicle, and with fewer restrictions for the installing location.

Thus, an interfering object can be properly detected by the position detector even if the object is located at a position which is hard to detect from the article transport vehicle.

And the external managing device issues the deceleration command to the article transport vehicle if and when the position of the interfering object with respect to the article transport vehicle is in the low speed area, which is defined in advance with respect to the position of the article transport vehicle, based on position information from the position detector.

When the deceleration command is issued, because the vehicle side travel controller changes the target travel speed, at which the article transport vehicle is caused to travel, from the normal travel speed to the reduced travel speed, the travel speed of the article transport vehicle is lowered.

Thus, even if an interfering object appears suddenly in front of the article transport vehicle, the travel speed of the article transport vehicle can be lowered to the reduced travel speed before the interfering object appears suddenly.

Therefore, the facility makes it easier for the article transport vehicle to avoid interfering with an interfering object.

For example, even if an interfering object appears suddenly in front of the article transport vehicle, it is easier to for the article transport vehicle to stop before the vehicle interferes with the interfering object.

And when the interfering object is a human worker, it is easier for the human worker to avoid interfering with the article transport vehicle because the travel speed of the article transport vehicle is low.

Examples of preferable embodiments of the present invention are described next.

In an embodiment of the article transport facility in accordance with the present invention, the low speed area is preferably defined to be a fan-shaped area whose radius is equal to a low speed distance defined in advance and which has its center at the position of the article transport vehicle and spreads forwardly of the article transport vehicle in plan view.

And the external managing device is preferably configured to transmit the deceleration command to the article transport vehicle if and when a distance from the article transport vehicle to the interfering object becomes less than or equal to the low speed distance.

With the above-described arrangement, because the low speed area is a fan-shaped area whose radius is equal to the low speed distance defined in advance, the external managing device is able to make a determination as to whether the position of the interfering object with respect to the article transport vehicle is in the low speed area defined in advance, or predetermined, with respect to the position of the article transport vehicle, using a simple method of determining if the distance from the article transport vehicle to the interfering object is less than or equal to the low speed distance.

In an embodiment of the article transport facility in accordance with the present invention, the position detector is preferably a wireless position measuring device which preferably includes wireless tags that are provided to the interfering object and that are configured to output positioning wireless signals which are wireless signals for position measurement, a plurality of receivers configured to receive the positioning wireless signals from the wireless tags that exist in the detection target area, and a position calculation portion which calculates positions of the wireless tags in the detection target area based on received information from the plurality of receivers wherein the wireless position measuring device performs a position measurement process in which the position of the interfering object in the detection target area is calculated, wherein a plurality of the wireless tags are preferably provided to each of the interfering objects, wherein the receiver is preferably configured to receive the positioning wireless signal from only one of the wireless tags at one time and to receive the positioning wireless signals from the plurality of wireless tags such that the receptions of the positioning wireless signals are staggered over time, wherein the wireless position measuring device is preferably configured to measure the positions of the interfering objects at every processing time by repeatedly performing the position measurement process at every processing time, and to perform, as the position measurement process, both of a multiple tag position measurement process in which the position of each of the interfering objects is calculated based on a position of each of the plurality of wireless tags associated with each of the interfering objects, and a single tag position measurement process in which the position of each of the interfering objects is calculated to be a position of one of the plurality of wireless tags that are associated with the each of the interfering objects, and wherein the external managing device is preferably configured to set the deceleration command such that the shorter a distance between the article transport vehicle and the interfering object is, the lower a speed indicated by the deceleration command is, and wherein, if the deceleration command set for a distance, between the article transport vehicle and the interfering object, calculated based on the position of the interfering object calculated in the multiple tag position measurement process is different from the deceleration command set for a distance, between the article transport vehicle and the interfering object, calculated based on the position of the interfering object calculated in the single tag position measurement process, the external managing device is preferably configured to select and issue the deceleration command that indicates a slower speed.

When the position of an interfering object is measured using positioning wireless signals from a single tag, the calculation may show a position that is different from the actual position of the wireless tag as the position of the interfering object, depending on the quality of the electromagnetic waves and on measurement accuracy, among other factors.

For this reason, a plurality of the wireless tags are provided to each of the interfering objects and the multiple tag position measurement process is performed in which the position calculation portion calculates the position of each of the plurality of the wireless tags so that the position of the interfering object is calculated based on the position of each of the plurality of wireless tags.

This reduces the difference between the measured position and the actual position to the extent possible so that the position of an interfering object can be measured accurately. As the multiple tag position measurement process, it is possible, for example, to take an average of the positions of the plurality of wireless tags.

In addition, the wireless position measuring device repeatedly performs the position measurement process at every processing time, and updates and stores the positions of the wireless tags obtained in the latest process.

Thus, the position of the interfering object obtained in the latest process may always be kept track of based on the positions of the wireless tags obtained in the latest process.

However, each receiver can receive the positioning wireless signal from only one of the wireless tags at one time and receives the positioning wireless signals from the plurality of wireless tags such that the receptions of the positioning wireless signals are staggered over time.

Thus, if the receiver is not able to receive the positioning wireless signal from a wireless tag properly, the position of the wireless tag is not updated, and the position obtained in the process before the latest process is still stored for that wireless tag.

Thus, if the interfering object moves during that time, there is a possibility that the position of the interfering object may not be measured properly even if the position of the interfering object is measured based on respective positions of the plurality of wireless tags as described above.

If the speed indicated by the deceleration command is set such that the shorter a distance between the article transport vehicle and the interfering object is, the lower the speed indicated by the deceleration command is, then the distance between the article transport vehicle and the interfering object cannot be calculated properly if the position of the interfering object cannot be measured properly as described above.

As a result, it may become impossible to set a proper speed as the speed indicated by the deceleration command.

Incidentally, when the position of an interfering object is measured using the positioning wireless signal from a single wireless tag, there may be a difference between the position which the wireless position measuring device measured as the position of the interfering object and the actual position of the interfering object.

However, the difference or the discrepancy with the actual position would be relatively small compared with the case where the position of an interfering object is measured by the multiple tag position measurement process in which the positioning wireless signal from one of the plurality of wireless tags associated with the interfering object cannot be received.

Accordingly, in the above-described arrangement, both of the multiple tag position measurement process in which the position of each of the interfering objects is calculated based on the positions of the plurality of wireless tags provided to each of the interfering objects, and the single tag position measurement process in which the position of each of the interfering objects is calculated to be the position of one of the plurality of wireless tags associated with the each of the interfering objects are performed.

And the deceleration command is issued that indicates a slower speed, between the deceleration command for the distance between the article transport vehicle and the interfering object that is calculated based on the position of the interfering object calculated in the multiple tag position measurement process, and deceleration command for the distance between the article transport vehicle and the interfering object that is calculated based on the position of the interfering object calculated in the single tag position measurement process.

Thus, for example, when the positioning wireless signal from one of the plurality of wireless tags associated with one of the interfering objects cannot be received and the measured position of the interfering object is different from its actual position, more strict or conservative one of the deceleration commands is selected as the deceleration command for the distance of between the article transport vehicle and the interfering object.

Thus, interference between the article transport vehicle and an interfering object can be avoided more reliably.

In an embodiment of the article transport facility in accordance with the present invention, the position detector preferably is a wireless position measuring device which preferably includes wireless tags configured to output positioning wireless signals which are wireless signals for position measurement, a plurality of receivers configured to receive the positioning wireless signals from the wireless tags that exist in the detection target area, and a position calculation portion which calculates positions of the wireless tags in the detection target area based on received information from the plurality of receivers wherein the wireless position measuring device performs a position measurement process in which the position of the interfering object in the detection target area is calculated, wherein a plurality of the wireless tags are preferably provided to each of the interfering objects, wherein the receiver is preferably configured to receive the positioning wireless signal from only one of the wireless tags at one time and to receive the positioning wireless signals from the plurality of wireless tags such that the receptions of the positioning wireless signals are staggered over time, wherein the wireless position measuring device is preferably configured to measure the positions of the interfering objects at every processing time by repeatedly performing the position measurement process at every processing time, and to perform, as the position measurement process, both of a multiple tag position measurement process in which the position of each of the interfering objects is calculated based on a position of each of the plurality of wireless tags associated with each of the interfering objects, and a single tag position measurement process in which the position of each of the interfering objects is calculated to be a position of one of the plurality of wireless tags that are associated with the each of the interfering objects, and wherein the external managing device is preferably configured to issue the deceleration command if and when at least one of; a distance, between the article transport vehicle and the interfering object, calculated based on the position of the interfering object calculated in the multiple tag position measurement process; and a distance, between the article transport vehicle and the interfering object, calculated based on the position of the interfering object calculated in the single tag position measurement process, becomes less than or equal to a distance from the article transport vehicle to an outer edge of the low speed area.

When the position of an interfering object is measured using positioning wireless signals from a single tag, the calculation may show a position that is different from the actual position of the wireless tag as the position of the interfering object, depending on the quality of the electromagnetic waves and on measurement accuracy, among other factors.

For this reason, a plurality of the wireless tags are provided to each of the interfering objects and the multiple tag position measurement process is performed in which the position calculation portion calculates the position of each of the plurality of the wireless tags so that the position of the interfering object is calculated based on the position of each of the plurality of wireless tags.

This reduces the difference between the measured position and the actual position to the extent possible so that the position of an interfering object can be measured accurately.

As the multiple tag position measurement process, it is possible, for example, to take an average of the positions of the plurality of wireless tags.

In addition, the wireless position measuring device repeatedly performs the position measurement process at every processing time, and updates and stores the positions of the wireless tags obtained in the latest process.

Thus, the position of the interfering object obtained in the latest process may always be kept track of based on the positions of the wireless tags obtained in the latest process.

However, each receiver can receive the positioning wireless signal from only one of the wireless tags at one time and receives the positioning wireless signals from the plurality of wireless tags such that the receptions of the positioning wireless signals are staggered over time.

Thus, if the receiver is not able to receive the positioning wireless signal from a wireless tag properly, the position of the wireless tag is not updated, and the position obtained in the process before the latest process is still stored for that wireless tag.

Thus, if the interfering object moves during that time, there is a possibility that the position of the interfering object may not be measured properly even if the position of the interfering object is measured based on respective positions of the plurality of wireless tags as described above.

If the speed indicated by the deceleration command is set such that the shorter the distance between the article transport vehicle and the interfering object is, the lower the speed indicated by the deceleration command is, then the distance between the article transport vehicle and the interfering object cannot be calculate properly if the position of the interfering object cannot be measured properly as described above.

As a result, it may become impossible to set a proper speed as the speed indicated by the deceleration command.

Incidentally, when the position of an interfering object is measured using the positioning wireless signal from a single wireless tag, there may be a difference between the position which the wireless position measuring device measured as the position of the interfering object and the actual position of the interfering object.

However, the difference or the discrepancy with the actual position would be relatively small compared with the case where the position of an interfering object is measured by the multiple tag position measurement process in which the positioning wireless signal from one of the plurality of wireless tags associated with the interfering object can not be received.

Accordingly, with the above-described arrangement, both of the multiple tag position measurement process in which the position of each of the interfering objects is calculated based on the positions of the plurality of wireless tags provided to each of the interfering objects, and the single tag position measurement process in which the position of each of the interfering objects is calculated to be the position of one of the plurality of wireless tags associated with the each of the interfering objects are performed.

The deceleration command is issued if and when at least one of; the distance, between the article transport vehicle and the interfering object, calculated based on the position of the interfering object calculated in the multiple tag position measurement process; and the distance, between the article transport vehicle and the interfering object, calculated based on the position of the interfering object calculated in the single tag position measurement process, becomes less than or equal to a distance from the article transport vehicle to an outer edge of the low speed area.

Thus, for example, when the positioning wireless signal from one of the plurality of wireless tags associated with the interfering object cannot be received and the measured position of the interfering object is different from its actual position, more strict or conservative distance is selected as the distance between the article transport vehicle and the interfering object.

Thus, interference between the article transport vehicle and an interfering object can be avoided more reliably.

In an embodiment of the article transport facility in accordance with the present invention, preferably provided as the position detector are a large area detector for detecting the position of the interfering object in an entire area of the detection target area, and a small area detector for detecting the position of the interfering object in an area in the detection target area in which it is difficult to detect the position of an interfering object with the large area detector.

With the above-described arrangement, the large area detector detects the position of an interfering object in an entire area of the detection target area whereas the small area detector detects the position of an interfering object in an area in the detection target area in which it is difficult to detect the position of an interfering object with the large area detector.

Thus, the configuration of the position detector can be simplified compared with the case where the position of an interfering object in the entire detection target area is detected by many small area detectors.

Thus, the configuration of the position detector which can properly detect an interfering object can be simplified.

In an embodiment of the article transport facility in accordance with the present invention, the vehicle side travel controller is preferably configured to change the normal travel speed to a lower speed based on a travel condition, and to maintain the target travel speed at the normal travel speed even if the deceleration command is issued from the ground side travel controller while the target travel speed is set to the normal travel speed if the normal travel speed is less than the reduced travel speed.

With the above-described arrangement, the normal travel speed is changed to a lower speed based on a travel condition (e.g., shaped of the travel path or the weight of the load when traveling), the article transport vehicle can travel at a speed suitable for the given travel condition.

And when the normal travel speed is less than the reduced travel speed, the target travel speed is maintained at the normal travel speed even if the deceleration command is issued; so, the speed suitable for the travel condition can be maintained without being changed to the reduced travel speed that is greater than the speed suitable for the travel condition.

In an embodiment of the article transport facility in accordance with the present invention, the article transport vehicle preferably includes a presence detector for detecting a presence of the interfering object located forwardly in the travel direction of the article transport vehicle, and an auxiliary travel controller which controls operation of the travel actuating device based on the detected information from the presence detector.

And the auxiliary travel controller is preferably configured to change the travel speed of the article transport vehicle from the normal travel speed to a reduced travel speed which is less than the normal travel speed if and when the interfering object is detected by the presence detector while the target travel speed is set to the normal travel speed.

With the above-described arrangement, if and when a presence of an article is detected by the presence detector, the auxiliary travel controller changes the travel speed of the article transport vehicle to the reduced travel speed.

As such, in addition to when the position detector detects the position of an interfering object, the travel speed of the article transport vehicle can be changed from the normal travel speed to the reduced travel speed when a presence of the interfering object is detected by the presence detector.

Thus, even if one of the detectors fails, an interfering object can be detected by the other detector, so that an interfering object can be detected by a detector more properly and reliably.

In an embodiment of the article transport facility in accordance with the present invention, the position detector is preferably configured to transmit interfering object presence information to the presence detector if and when the distance from the article transport vehicle to the interfering object becomes less than or equal to a deceleration distance defined in advance, based on position information of the detected interfering object and travel position information for the article transport vehicle.

And the presence detector is preferably configured to be changed to a detection state in which a presence of the interfering object is detected, upon receiving the interfering object presence information from the said position detector.

With the above-described arrangement, the position detector transmits interfering object presence information to the presence detector if and when the distance from the article transport vehicle to the interfering object becomes less than or equal to the deceleration distance defined in advance.

And upon receiving interfering object presence information from the position detector, the presence detector is changed to the detection state even if the presence detector has not detected the presence of the object. When the presence detector is thus changed to the detection state, the auxiliary travel controller changes the travel speed of the article transport vehicle from the normal travel speed to the reduced travel speed.

Therefore, when the position detector detects the position of an interfering object, the travel speed of the article transport vehicle is changed from the normal travel speed to the reduced travel speed in two ways, namely, changing the travel speed of the article transport vehicle from the normal travel speed to the reduced travel speed by the external managing device and the vehicle side travel controller, and changing the travel speed of the article transport vehicle from the normal travel speed to the reduced travel speed by the presence detector and the auxiliary travel controller.

Therefore, for example, even if a situation occurs in which the target travel speed cannot be changed to the reduced travel speed in one way, the travel speed of the article transport vehicle can be changed to the reduced travel speed in another way. Thus, the target travel speed can be changed to the reduced travel speed more precisely and reliably.

In an embodiment of the article transport facility in accordance with the present invention, the external managing device is preferably configured to be able to determine a kind of interfering object based on detected information from the position detector, and to set a predefined low speed distance differently depending on the kind of interfering object.

With the above-described arrangement, the low speed distance can be set differently (i.e., set to different distances) depending on the kind of interfering object. Thus, the low speed distance can be set in accordance with the nature of the interfering object.

For example, when the interfering object is a human worker, a longer low speed distance may be used since it is possible that the worker may start to walk toward the article transport vehicle.

And when the interfering object is an article placed on the floor, a shorter low speed distance may be used because the article does not move.

Thus, the number of times that the article transport vehicle is decelerated can be reduced and the articles can be transported more efficiently by selecting a shorter low speed distance for an interfering object for which the possibility of interference is small.

And a longer low speed distance may be selected for an interfering object with a greater possibility of interference in order to reliably prevent the article transport vehicle from interfering with the interfering object.

In an embodiment of the article transport facility in accordance with the present invention, the external managing device is preferably configured to be able to set a low speed distance defined in advance for when the interfering object is located forwardly of the article transport vehicle in the travel direction to be different from the low speed distance defined in advance for when the interfering object is located rearwardly of the article transport vehicle in the travel direction.

With the above-described arrangement, the low speed distance can be set differently for when an interfering object is located forwardly of the article transport vehicle in the travel direction and for when it is located rearwardly of the article transport vehicle in the travel direction.

Thus, for example, for the forward side in the travel direction which is the direction of movement of the article transport vehicle, a longer low speed distance may be selected since it is easier to interfere with an interfering object.

And for the rearward side in the travel direction which is not the direction of movement of the article transport vehicle, a shorter low speed distance may be selected since it is more difficult to interfere with an interfering object.

Thus, the number of times that the article transport vehicle is decelerated can be reduced and the articles can be transported more efficiently by selecting a shorter low speed distance for the side that has a lower possibility of interference between the forward side and the rearward side in the travel direction.

And a longer low speed distance may be selected for the side with a greater possibility of interference in order to reliably prevent the article transport vehicle from interfering with the interfering object.

DETAILED DESCRIPTION

First Embodiment

The first embodiment in accordance with the present invention is described next with reference to the drawings.

Figure 1:
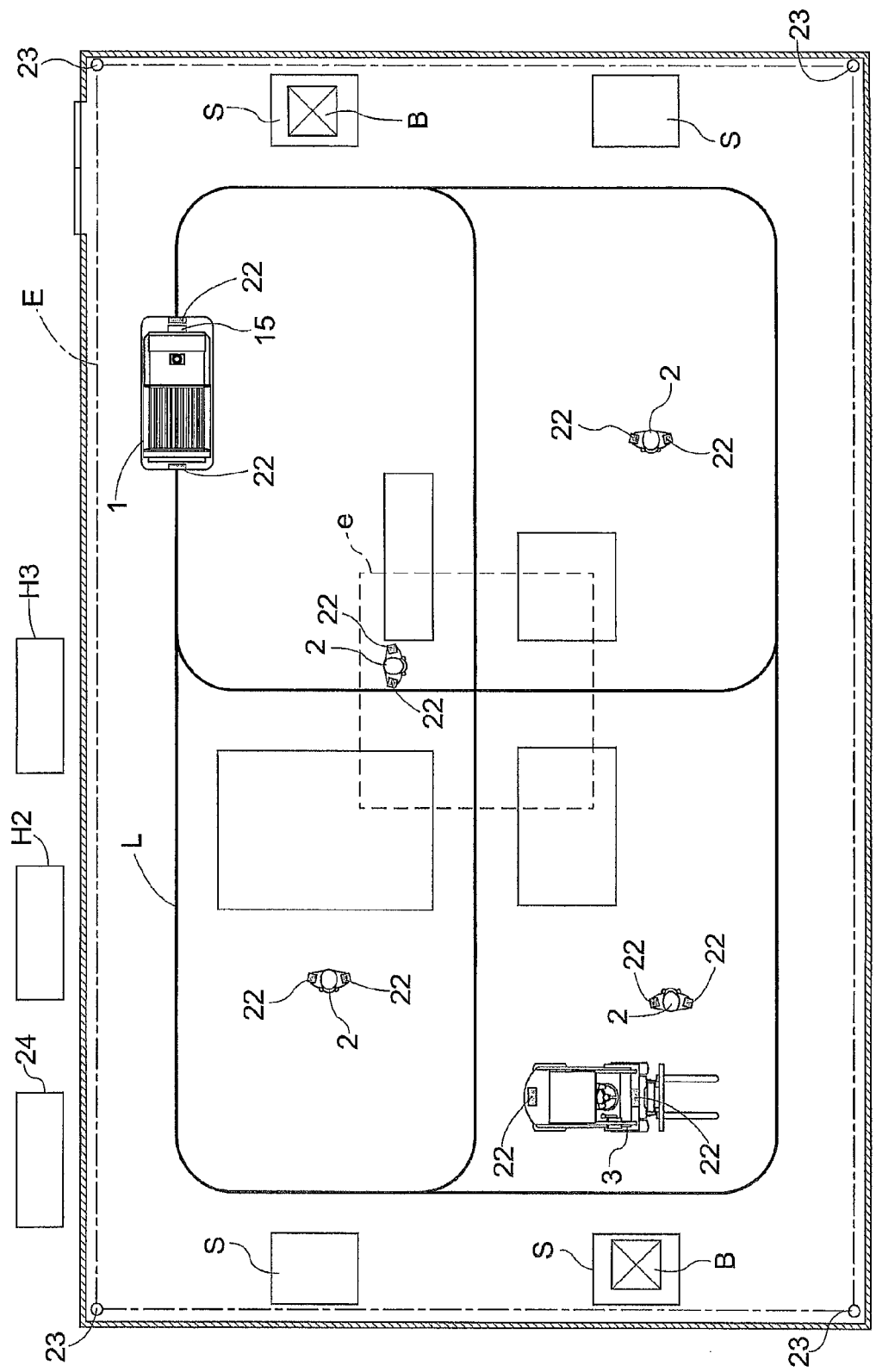
FIG. 1 is a plan view of an article transport facility.

As shown in FIG. 1, an article transport facility includes a plurality of stations S, each of which functions as an article transfer location provided at a side of the travel path L, and an article transport vehicle 1 configured to travel on the floor and along the travel path L extending by way of or along a plurality of stations S.

And the article transport vehicle 1 travels autonomously along the travel path L to transport articles (i.e. pallets as well as goods and things received and supported by the pallets) among the plurality of stations S one article at a time.

In addition, in the article transport facility, workers 2 from outside walk on the floor and a fork lift truck 3, operated by the driver in the fork lift truck 3, also travels on the floor.

While the travel path L is shown with solid lines in FIG. 1, it only represents a virtual travel path along which the article transport vehicle 1 should travel. And no rail is installed for guiding the article transport vehicle 1.

Figure 2:
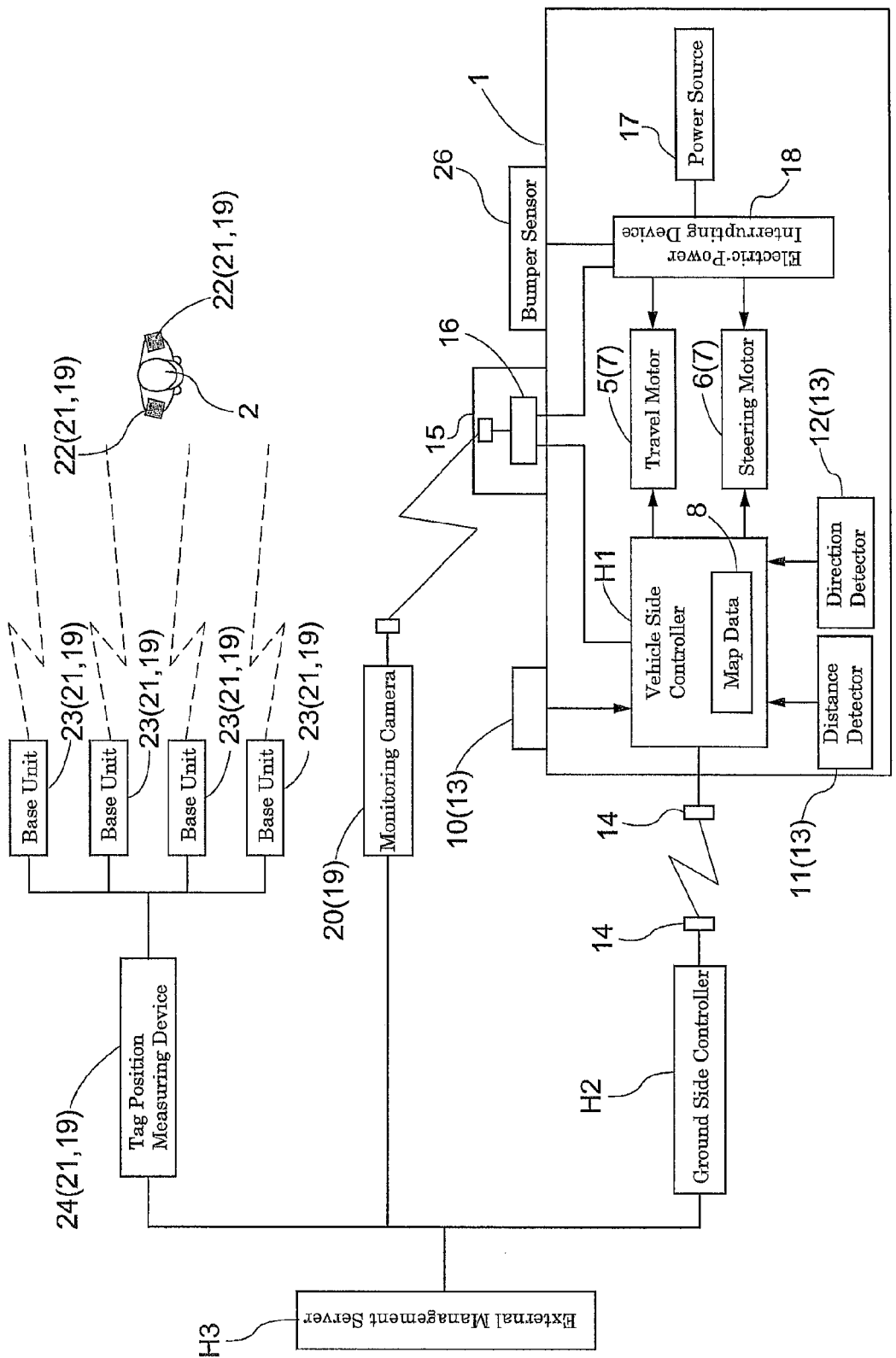
FIG. 2 is a control block diagram for the article transport facility.

As shown in FIG. 2, the article transport vehicle 1 includes a travel motor 5 for drivingly rotating driven travel wheels (not shown), and a steering motor 6 for allowing freely rotatable travel wheels (not shown) to be rotated about a vertical axis (axis extending along a vertical direction) and for changing the direction of freely rotatable travel wheels.

The article transport vehicle 1 is configured to travel as the travel motor 5 drivingly rotates the driven travel wheels and to change its travel direction as the steering motor 6 changes the direction of freely rotatable travel wheels.

The travel motor 5 and the steering motor 6 define a travel actuating device 7 whereby the article transport vehicle 1 is configured to be able to travel along the travel path L by the operation of the travel actuating device 7.

Figure 3:
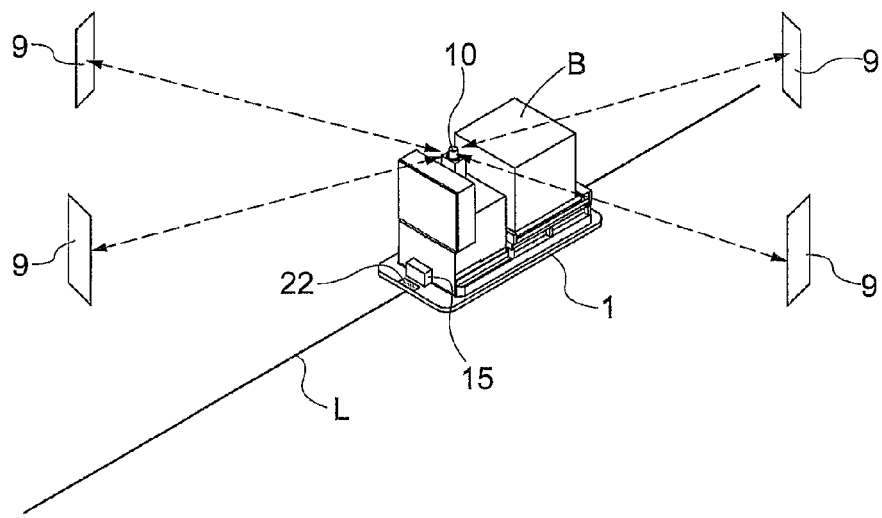
FIG. 3 is a perspective view of an article transport vehicle.

As shown in FIG. 3, the article transport facility includes a plurality of reflecting plates 9 that are located at positions that correspond to the travel path L, using walls among other things that are located to one or both sides of the travel path L.

Provided in an upper portion of the article transport vehicle 1 is a light emitter-receiver 10 that emits Laser light in sweeping motions in a horizontal plane and that receives the reflected light reflected by the reflecting plates 9.

In addition, the article transport vehicle 1 includes a distance detector 11 for detecting, or measuring, travel distance, such as a rotary encoder, etc., that outputs pulse signals as the driven travel wheel is rotated, and a direction detector 12 such as a rate gyro that detects the direction of the article transport vehicle 1.

The emitter-receiver 10, the distance detector 11, and the direction detector 12 define a travel position detector 13 for detecting the travel position of the article transport vehicle 1.

The travel position detector 13 is mounted on, or is provided to, the article transport vehicle 1.

As shown in FIG. 2, a vehicle side controller H1 that functions as a vehicle side travel controller for controlling the operation of the travel actuating device 7 is provided to the article transport vehicle 1.

The vehicle side controller H1 is configured to control the operation of the travel actuating device 7, based on travel position information detected by the travel position detector 13 and travel command information from the ground side controller H2 which functions as a ground side travel controller, in order to cause the article transport vehicle 1 to travel toward a target travel position along the travel path L at a target travel speed.

More specifically, the vehicle side controller H1 is configured to confirm, verify, or otherwise determine the current position of the article transport vehicle 1 based on sweep angle information of the reflected light received by the emitter-receiver 10 and position information on the plurality of reflecting plates 9, and to control the operation of the travel motor 5 and the steering motor 6 to cause the article transport vehicle 1 to travel along the travel path L at a target travel speed to the target travel position that corresponds to the station S indicated by, or specified in, a travel command issued from the ground side controller H2 based on the current position information, the detected information from the distance detector 11, and the detected information from the direction detector 12.

The travel path L is an imaginary path along which the article transport vehicle 1 should travel as described above.

Path information of the travel path L is stored in the vehicle side controller H1 as map data. And when a travel command is issued, the vehicle side controller H1 determines a route along the travel path L.

Figure 4:
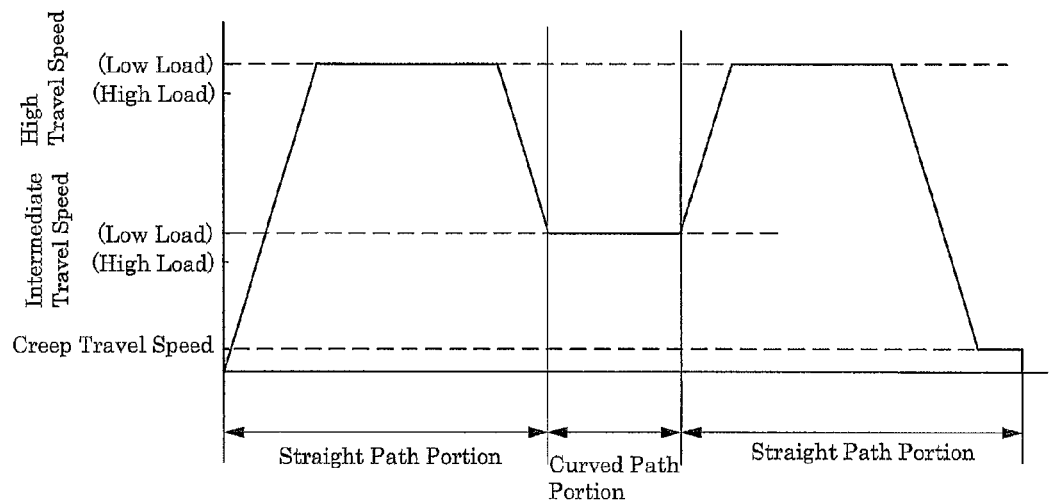
FIG. 4 is a time chart which shows how the target travel speed of the article transport vehicle is changed.

As shown in FIG. 4, defined as the normal travel speed in the vehicle side controller H1 are a high travel speed for when the article transport vehicle 1 travels in a straight path portion of the travel path L, a intermediate travel speed for when the article transport vehicle 1 travels in a curved path portion of the travel path L, and a creep travel speed.

In addition, a travel speed when traveling under a low load condition as well as a travel speed when traveling under a high load condition are defined for each of the high travel speed and the intermediate travel speed.

Incidentally, in the present embodiment, the high travel speed under a low load condition is set to be 200 m/min, the high travel speed under a high load condition is set to be 160 m/min, the intermediate travel speed under a low load condition is set to be 60 m/min, the intermediate travel speed under a high load condition is set to be 40 m/min, and the creep travel speed is set to be 5 m/min.

Thus, these speeds are defined so that they decrease in the order from the high travel speed under a low load condition, the high travel speed under a high load condition, the intermediate travel speed under a low load condition, the intermediate travel speed under a high load condition, and to the creep travel speed.

Note that traveling under a low load condition means that the article transport vehicle is traveling with no load, i.e., with the article transport vehicle supporting no articles.

And traveling under a high load condition means that the article transport vehicle is traveling with load, i.e., with the article transport vehicle supporting an article.

Thus, the vehicle side controller H1 is configured to reduce the normal travel speed to a lower speed based on a travel condition (shape of the travel path L, and/or whether an article is being transported) in order to set the target travel speed to a speed less than the high travel speed when the article transport vehicle 1 travels in a curved portion of the travel path L or under the high load condition, with respect to the high travel speed for when the article transport vehicle 1 travels in a straight path portion in the travel path L under the low load condition.

And as shown in FIG. 4, when causing the article transport vehicle 1 to travel along the travel path L, the vehicle side controller H1 is configured to control the operation of the travel actuating device 7 in order to cause the article transport vehicle 1 to: travel with the target travel speed set to the high travel speed when traveling in a straight path portion; to travel with the target travel speed set to the intermediate travel speed when traveling in a curved path portion; and to stop at the target travel position after causing it to decelerate to the creep travel speed.

FIG. 4 shows the target travel speed when the article transport vehicle 1 under the low load condition travels in a straight path portion, a curved path portion, and then a straight path portion in that order.

In addition, as shown in FIG. 2, the article transport vehicle 1 is provided with an interfering object sensor 15 which functions as a presence detector for detecting the presence of an interfering object located forwardly of the article transport vehicle 1 in the travel direction thereof, a sensor controller 16 which functions as an auxiliary travel controller for controlling the operation of the travel actuating device 7 based on the detected information from the interfering object sensor 15, a bumper sensor 26 for detecting that an interfering object has contacted a bumper of the article transport vehicle 1, a power source 17 (battery) for supplying electric power to the travel actuating device 7 (the travel motor 5 and the steering motor 6), and an electric-power interrupting device 18 which can interrupt supply of the electric power from the power source 17 to the travel actuating device 7.

Incidentally, an interfering object which the interfering object sensor 15 and the bumper sensor 26 detect is any object that has a possibility of interfering, colliding, or contacting the article transport vehicle 1, such as a human worker 2, a fork lift truck 3, or an article placed on the floor.

The sensor controller 16 is incorporated within the interfering object sensor 15 and is configured to determine the distance from the article transport vehicle 1 to the interfering object based on the detected information from the interfering object sensor 15 if and when the presence of an interfering object is detected by the interfering object sensor 15.

In addition, a wall may be installed laterally of the travel path L. Or an article storage rack may be installed on the floor such that it would not interfere with the article transport vehicle 1 traveling along the travel path L.

Or an article may be placed directly on the floor.

The positions of the interfering objects currently installed on the floor such as a wall or a rack, and the positions of the interfering objects that are scheduled to be placed on the floor are stored in the sensor controller 16 in advance as a layout map.

And even if the interfering object sensor 15 detects an interfering object whose position is stored in advance, the sensor controller 16 is configured to cancel or nullify the detected information, and is configured not to determine that an interfering object is present.

And if and when a presence of an interfering object is detected by the interfering object sensor 15 while the target travel speed is set to the normal travel speed, the sensor controller 16 is configured to cause the article transport vehicle 1 to decelerate either by reducing the speed upper limit for the target travel speed set by the vehicle side controller H1 or by interrupting the supply of the electric power to the travel actuating device 7 with the electric-power interrupting device 18, depending on the distance from the article transport vehicle 1 to the interfering object that is determined based on the detected information, to perform an emergency stop.

Figure 5:
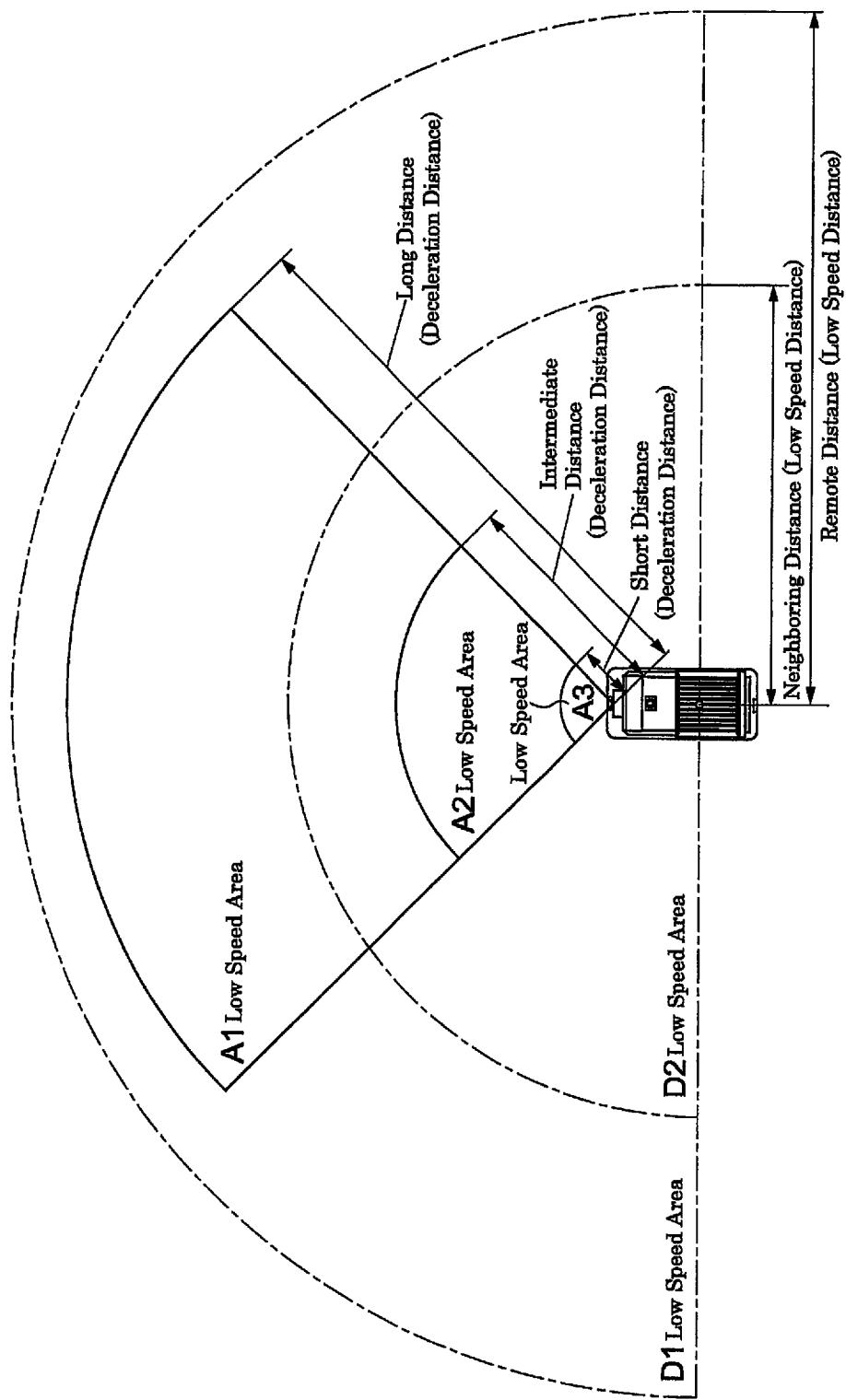
FIG. 5 shows areas used in changing the target travel speed of the article transport vehicle.

To describe in more detail, as shown in FIG. 5, a long distance (20 m), an intermediate distance (8 m) which is shorter than the long distance, and a short distance (2 m) which is shorter than the intermediate distance are defined in advance as the deceleration distances in the sensor controller 16.

And defined in advance as low speed areas for a small area detector are fan-shaped areas (i.e., wedge-shaped circular sections) that spread forwardly of the article transport vehicle 1, each of which has its center at the position of the article transport vehicle 1, and whose radii are equal to respective deceleration distances defined above, namely, a fan-shaped area (area A1) whose radius is equal to the long distance, a fan-shaped area (area A2) whose radius is equal to the intermediate distance, and a fan-shaped area (area A3) whose radius is equal to the short distance.

And the sensor controller 16 is configured to transmit long distance approach information to the vehicle side controller H1 if and when an interfering object has entered the area A1 and the distance from the article transport vehicle 1 to the interfering object is less than or equal to the long distance and is greater than the intermediate distance.

And the sensor controller 16 is configured to transmit intermediate distance approach information to the vehicle side controller H1 if and when the interfering object has entered the area A2 and the distance from the article transport vehicle 1 to the interfering object is less than or equal to the intermediate distance and is greater than the short distance.

And if and when the interfering object has entered the area A3 and the distance from the article transport vehicle 1 to the interfering object is less than the short distance, the sensor controller 16 is configured to control the operation of the electric-power interrupting device 18 in order to cause the electric-power interrupting device 18 to interrupt the electric power to the travel actuating device 7 and to cause the article transport vehicle 1 to perform an emergency stop.

Figure 6:
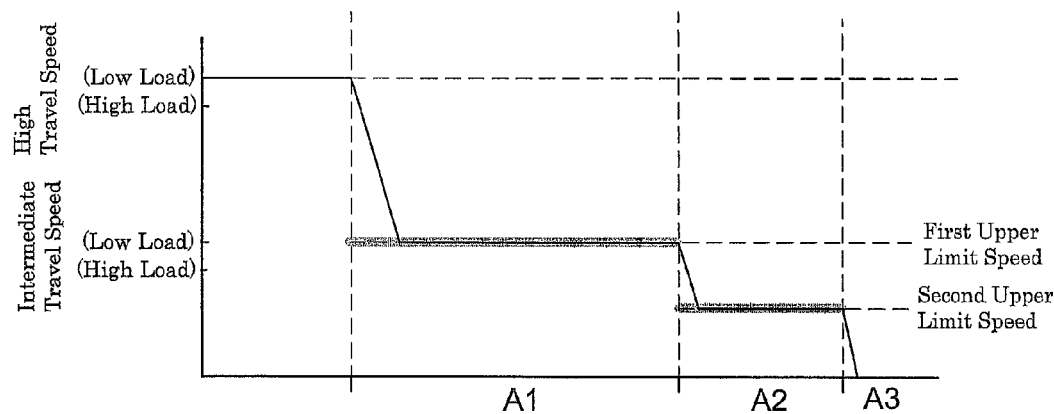
FIG. 6 is a time chart which shows changes in the target travel speed of the article transport vehicle (high speed, low load)
Figure 7:
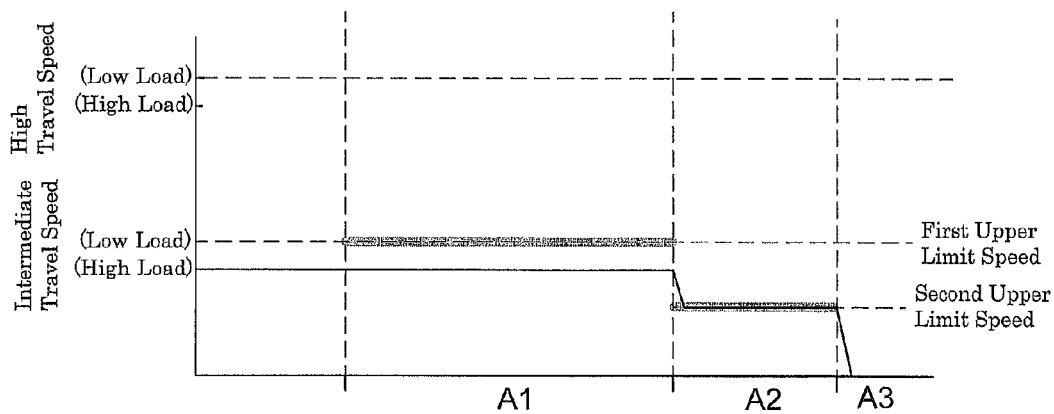
FIG. 7 is a time chart which shows changes in the target travel speed of the article transport vehicle (low speed, high load)

As shown in FIG. 6 FIG. 7, a first upper limit speed (60 m/min) which is less than the high travel speed and is equal to the medium traveling speed and a second upper limit speed (30 m/min) which is less than the intermediate travel speed are defined in the vehicle side controller H1 as reduced travel speeds.

And the vehicle side controller H1 is configured to set the upper speed limit for the target travel speed to be the first upper limit speed when the long distance approach information is received from the sensor controller 16, and to set the upper speed limit for the target travel speed to be the second upper limit speed when the intermediate distance approach information is received from the sensor controller 16.

Thus, for example, as shown in FIG. 6, if and when the upper speed limit for the target travel speed is restricted to the first upper limit speed or the second upper limit speed while the article transport vehicle 1 is traveling at the high travel speed (under a low load condition), the target travel speed of the article transport vehicle 1 is set to the upper speed limit, i.e., either the first upper limit speed or the second upper limit speed.

Thus, the vehicle side controller H1 is configured to change the target travel speed from the normal travel speed to the reduced travel speed if and when a deceleration command is issued from the sensor controller 16, i.e., if and when the long distance approach information or intermediate distance approach information is received, while the target travel speed is set to a normal travel speed.

In addition, for example, as shown in FIG. 7, when the article transport vehicle 1 is traveling at the intermediate travel speed (under a high load condition), the target travel speed for the article transport vehicle 1 is not changed from the intermediate travel speed even if the upper speed limit of the target travel speed is restricted to the first upper limit speed.

And when the upper speed limit for the target travel speed is restricted to the second upper limit speed, the target travel speed for the article transport vehicle 1 is changed to the upper speed limit, namely, the second upper limit speed.

As such, when the normal travel speed is less than the reduced travel speed, the vehicle side controller H1 is configured to maintain the target travel speed at the normal travel speed even if a deceleration command is issued from the sensor controller 16 while the target travel speed is set at the normal travel speed.

The bumper sensor 26 is incorporated within the bumper of the article transport vehicle 1 and is a tape switch.

And the electric-power interrupting device 18 interrupts the electric power to the travel actuating device 7 if and when the bumper sensor 26 detects that an interfering object contacted the bumper.

A ground side controller H2 which issues travel commands to the article transport is provided on the ground side within the article transport facility.

And a transmitter-receiver 14 for mutually transmitting and receiving a variety of information is provided to each of the vehicle side controller H1 and the ground side controller H2. Here, an item being provided "on the ground side" means that the item is not provided to the article transport vehicle 1 but is provided on the floor or the ceiling of the article transport facility, or to an object such as an article storage rack, etc., which is installed in the article transport facility.

And the ground side controller H2 is configured to transmit to the vehicle side controller H1 a travel command which specifies the station S of transport origin from which an article is to be transported and the station S of transport destination.

The vehicle side controller H1 is configured to control the operation of the travel actuating device 7 based on travel position information and travel command information, and to the transmit travel position information of the article transport vehicle 1 to the ground side controller H2.

In addition, provided on the ground side of the article transport facility are position detectors 19 for detecting the positions of interfering objects that may exist in a detection target area E which includes the area in which the travel path L is installed, and an external management server H3 which functions as an external managing device which issues a deceleration command to the article transport vehicle 1 if and when the distance from the article transport vehicle 1 to an interfering object becomes less than or equal to a low speed distance based on position information of the interfering object from the position detector 19 and travel position information for the article transport vehicle 1.

Figure 8:
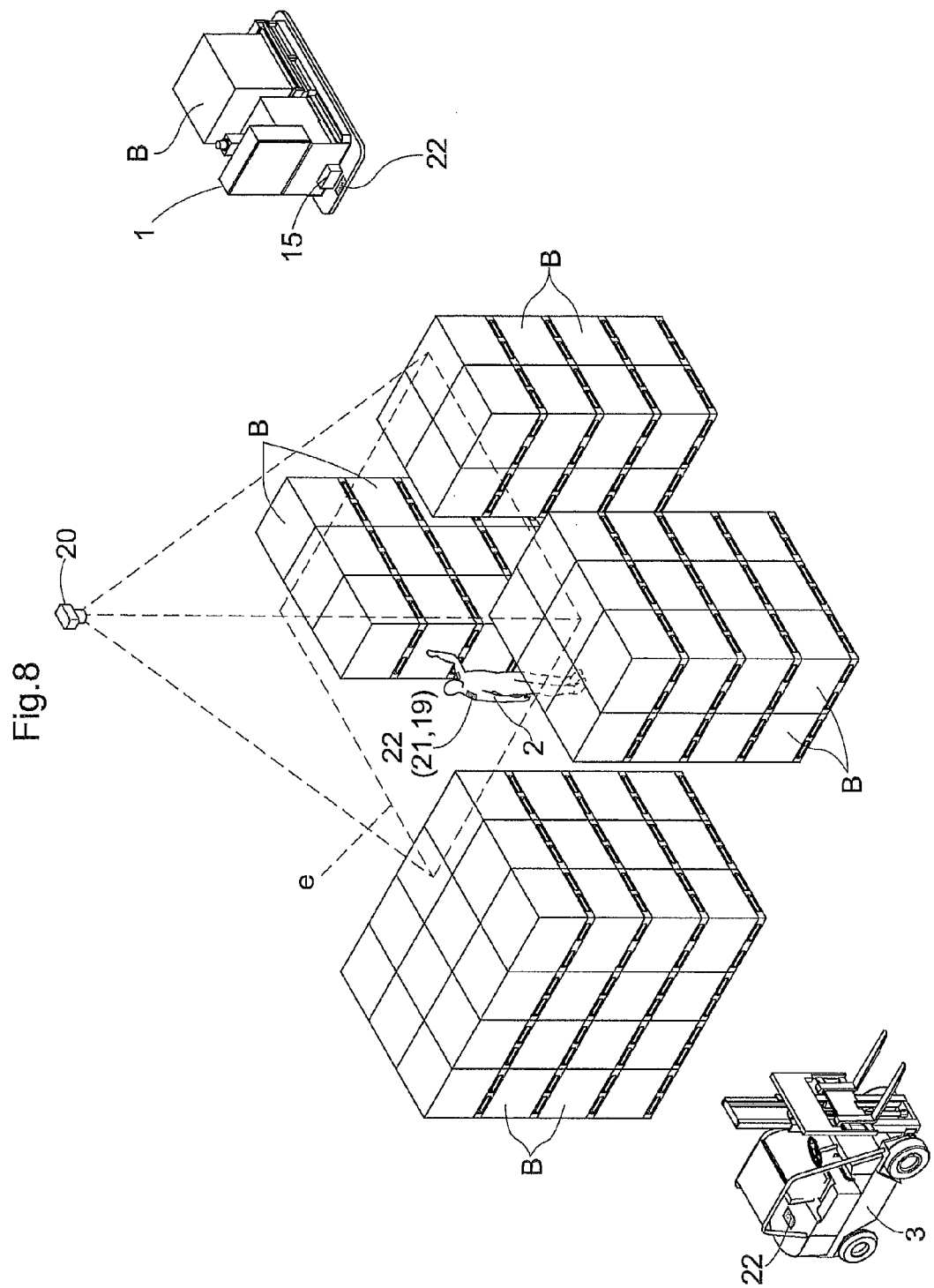
FIG. 8 is a perspective view showing a detection area.

As shown in FIGS. 1 and 8, provided as the position detectors 19 are a wireless position measuring system 21 which functions as a large area detector for detecting the position of an interfering object in the entire detection target area E, and a monitoring camera 20 which functions as a small area detector for detecting the position of an interfering object in an area (detection area e) within the detection target area E in which it is difficult to detect the position of an interfering object with the large area detector.

An Axi-Vision camera (a three-dimensional distance-mapping imaging camera) is provided as the monitoring camera 20.

The wireless position measuring system 21 includes wireless tags 22 which are carried by workers 2 and the fork lift truck 3 and which are configured to output positioning wireless signals which are wireless signals for position measurement, a plurality of base units 23 configured to receive the positioning wireless signals from the wireless tags 22 in the detection target area E, and a tag position measuring device 24 for performing a position measurement process in which the position of each wireless tag 22 is calculated based on the information received by the base units 23.

The information for position measurement can be communicated from each wireless tag 22 to a base unit 23 by wireless communication using the UWB (Ultra-Wide Band) technology.

Thus, the wireless position measuring system 21 corresponds to the wireless position measuring device in the present invention, and the tag position measuring device 24 corresponds to the position calculation portion in the present invention.

In addition, in the present embodiment, a plurality of receivers provided to the wireless position measuring system 21 are the plurality of base units 23.

Incidentally, as shown in FIG. 1, four base units 23 are provided such that one base unit 23 is located at each of the four corners of the detection target area E.

The interfering objects which the wireless position measuring system 21 detects, are the worker 2 and the fork lift truck 3 each carrying the wireless tags 22.

And the wireless position measuring system 21 is configured to transmit position information of the detected interfering object to the external management server H3.

Incidentally, objects without the wireless tags 22, such as an article, are not detected as interfering objects.

And attribute information about the object carrying the wireless tags 22 is transmitted in the information transmitted from the wireless tag 22.

And the wireless position measuring system 21 is configured to determine the attribute (i.e., a worker 2 or the fork lift truck 3) of the interfering object carrying the wireless tags 22 from the information from the wireless tags 22.

Each worker 2 carries two wireless tags 22 and each fork lift truck 3 carries two wireless tags 22.

In the present embodiment, the wireless position measuring system 21 keeps track of, or manages, the total number of the wireless tags 22 that exist in the detection target area E as well as identifying information for every wireless tag 22 that exists in the detection target area E. (The managing portion that manages the identifying information may be provided to the base units 23, or to the tag position measuring device 24.) And polling wireless signals are transmitted all at once to each of the wireless tags 22 that exist in the detection target area E in sequence in a predetermined polling order.

The polling wireless signals are transmitted all at once from the four base units 23.

Each wireless tag 22 that receives the polling wireless signal transmits a positioning wireless signal as a response. This positioning wireless signal is received by two or more base units 23 out of the four base units 23.

And the tag position measuring device 24 uses a known positioning scheme, such as TDOA and TOA, to calculate the position of the wireless tag 22.

In addition, for the pair of wireless tags 22 carried by the same interfering object, the tag position measuring device 24 calculates their positions serially and in succession.

More specifically, each receiver is configured such that it can receive the positioning wireless signal from only one wireless tag 22 at a time and receives the positioning wireless signals from a plurality of wireless tags 22 such that the signal receptions are spread or staggered over time.

The wireless position measuring system 21 is configured to calculate the positions of the wireless tags 22 one by one at every predetermined cycle in the polling order mentioned above, and to perform a position measurement process in which the position of an interfering object is measured, or determined, based on the calculated positions of the wireless tags 22.

The predetermined cycle mentioned above is defined to be an amount of time in which the positions can be calculated for the maximum number of the wireless tags 22 that can exist in the detection target area E.

In the present embodiment, the predetermined cycle is, or corresponds to, the processing time.

When the positions of all the wireless tags 22 that exist in the detection target area E are calculated, the wireless position measuring system 21 returns to the beginning of the polling order and continues to transmit the polling wireless signals.

Thus, the wireless position measuring system 21 is configured to measure the positions of the workers 2 and the fork lift truck 3 at every processing time by repeatedly performing the position measurement process at every processing time.

If the monitoring camera 20 detects movement of any object in the detection area e by comparing image information captured most recently with image information captured in the past, the monitoring camera 20 is configured to determine the object that has moved to be an interfering object.

In addition, image information of the article transport vehicle 1 is stored in the monitoring camera 20 in advance.

And if the monitoring camera 20 determines that the object that has moved is the article transport vehicle 1, the monitoring camera 20 is configured to cancel, or nullify, the detected information for the moving object, and is configured not to determine that an interfering object exists.

And the monitoring camera 20 is configured to derive the distance from the article transport vehicle 1 to the interfering object from the position information for the article transport vehicle 1 transmitted from the external management server H3 and the position information for the detected interfering object, and to transmit the distance information from the article transport vehicle 1 to the interfering object to the external management server H3.

Incidentally, the travel position information for the article transport vehicle 1 is transmitted to the external management server H3 from the ground side controller H2.

And the travel position information is transmitted from the external management server H3 to the monitoring camera 20.

The external management server H3 is configured to be able to set the low speed distance, for when an interfering object is located forwardly of the article transport vehicle 1 in the travel direction, to be different from the low speed distance for when an interfering object is located rearwardly of the article transport vehicle 1 in the travel direction.

And in the present embodiment, a remote distance (25 m) and a neighboring distance (15 m) which is shorter than the remote distance are defined in the external management server H3 as the low speed distances for the large area detector for when an interfering object is located forwardly of the article transport vehicle 1 in the travel direction.

And defined in the external management server H3 as the low speed areas for the large area detector for when an interfering object is located forwardly of the article transport vehicle 1 in the travel direction are a semi-circular area (area D1) which has its center at the position of the article transport vehicle 1, which spreads forwardly of the article transport vehicle 1, and whose radius is equal to the remote distance, and a semi-circular area (area D2) which has its center at the position of the article transport vehicle 1, which spreads forwardly of the article transport vehicle 1, and whose radius is equal to the neighboring distance.

In addition, the low speed distance is set to be 0 m for when an interfering object is located rearwardly of the article transport vehicle 1.

Thus, the low speed distance for when an interfering object is located rearwardly of the article transport vehicle 1 can be set to be less than the low speed distance for when an interfering object is located forwardly of the article transport vehicle 1.

Incidentally, the remote distance is set to be greater than the long distance and the neighboring distance is set to be less than the long distance, and greater than the intermediate distance.

And the external management server H3 is configured to transmit remote approach information to the ground side controller H2 if and when an interfering object has entered the area D1 and the distance from the article transport vehicle 1 to the interfering object is less than or equal to the remote distance and is greater than the neighboring distance, based on the position information for the interfering object transmitted from the monitoring camera 20 or the wireless position measuring system 21 and the travel position information for the article transport vehicle 1 from the ground side controller H2, and is configured to transmit neighboring approach information to the ground side controller H2 if and when the interfering object has entered the area D2, and the distance from the article transport vehicle 1 to the interfering object becomes less than or equal to the neighboring distance.

When the remote approach information and the neighboring approach information are received from the external management server H3, the ground side controller H2 is configured to transmit, or forward, the remote approach information and the neighboring approach information to the vehicle side controller H1.

And the vehicle side controller H1 is configured to set the upper speed limit for the target travel speed to be the first upper limit speed when it receives the remote approach information from the sensor controller 16, and to set the upper speed limit for the target travel speed to be the second upper limit speed when it receives the neighboring approach information from the sensor controller 16.

And if and when a deceleration command is issued from the external management server H3 (i.e. if and when the remote approach information or the neighboring approach information is received) while the target travel speed is set to be a normal travel speed, the vehicle side controller H1 is configured to set the target travel speed to be the reduced travel speed that is less than the normal travel speed.

That is, several different distances are defined as low speed distances.

And the external management server H3 is configured to set the speed as indicated by the deceleration command such that the shorter the distance between the article transport vehicle 1 and an interfering object with respect to the low speed distance is, the lower the speed is set.

As shown in FIG. 5, the monitoring camera 20 is provided with a camera control portion (not shown) in which a long distance (20 m), an intermediate distance (8 m) which is shorter than the long distance, and a short distance (2 m) which is shorter than the intermediate distance are defined in advance as deceleration distances, which are identical to those defined for the sensor controller 16.

The monitoring camera 20 is configured such that command information can be wirelessly communicated from the monitoring camera 20 to the sensor controller 16.

And defined as the low speed areas for the small area detector are fan-shaped areas whose radii are equal to respective deceleration distances defined above, namely, a fan-shaped area (area A1) whose radius is equal to the long distance, a fan-shaped area (area A2) whose radius is equal to the intermediate distance, and a fan-shaped area (area A3) whose radius is equal to the short distance.

In other words, in the present embodiment, each of area A1, area A2, area A3, area D1 area, and area D2 is defined in advance as the low speed areas.

And the low speed areas are defined to have their respective radii equal to the predetermined deceleration distances and to be fun-shaped areas which share the same center at the position of the article transport vehicle 1 and spread forwardly of the article transport vehicle 1, in plan view.

An outer edge of a given low speed area is a portion which forms the arc of the low speed area.

In addition, the monitoring camera 20 is configured to be able to transmit command information to the sensor controller 16 for the interfering object sensor 15.

And the monitoring camera 20 is configured: to issue a first deceleration command to the sensor controller 16 if the distance from the article transport vehicle 1 to an interfering object is less than or equal to the long distance and is greater than the intermediate distance; to issue a second deceleration command to the sensor controller 16 if the distance from the article transport vehicle 1 to the interfering object is less than or equal to the intermediate distance and is greater than the short distance; and to issue a third deceleration command to the sensor controller 16 if the distance from the article transport vehicle 1 to the interfering object is less than or equal to the short distance.

And even if the presence of an interfering object is not detected by the interfering object sensor 15, the sensor controller 16 is configured to be forced to be in a detection state in which the distance from the article transport vehicle 1 to an interfering object is deemed to be less than or equal to the long distance and greater than the intermediate distance if and when the first deceleration command is issued from the monitoring camera 20, and to transmit long distance approach information to the vehicle side controller H1, and also to be forced to be in a detection state in which the distance from the article transport vehicle 1 to an interfering object is deemed to be less than or equal to the intermediate distance and greater than the short distance if and when the second deceleration command is issued from the monitoring camera 20, and to transmit intermediate distance approach information to the vehicle side controller H1.

In addition, even if the presence of an interfering object is not detected by the interfering object sensor 15, the sensor controller 16 is configured to be forced to be in a detection state in which the distance from the article transport vehicle 1 to an interfering object is deemed to be less than or equal to the short distance if and when the third deceleration command is issued from the monitoring camera 20, and to control the operation of the electric-power interrupting device 18 in order to interrupt the electric power to the travel actuating device 7 with the electric-power interrupting device 18 to cause the article transport vehicle 1 to perform an emergency stop.

Thus, the sensor controller 16 is configured to switch to a detection state in which the presence of an interfering object is deemed to be detected upon receiving interfering object presence information from the monitoring camera 20.

In addition, if and when an interfering object is detected by the monitoring camera 20 while the target travel speed is set to the normal travel speed, the sensor controller 16 is configured to transmit the long distance approach information or the intermediate distance approach information to the vehicle side controller H1 to change the travel speed of the article transport vehicle 1 from the normal travel speed to the reduced travel speed, namely, the first upper limit speed or the second upper limit speed, or to control the operation of the electric-power interrupting device 18 on its own in order to change the travel speed of the article transport vehicle 1 from the normal travel speed to a reduced travel speed for a stop speed.

The long distance approach information and intermediate distance approach information are transmitted from the sensor controller 16 to the vehicle side controller H1, whereas the remote approach information and the neighboring approach information are transmitted from the external management server H3 to the vehicle side controller H1.

And when the article transport vehicle 1 travels toward an interfering object while traveling at a high travel speed (under the low load condition), and as the interfering object enters the area D1, area A1, area D2, and area A2 in that order and shown in FIG. 5, the upper limit speed is changed as follows.

Figure 9:
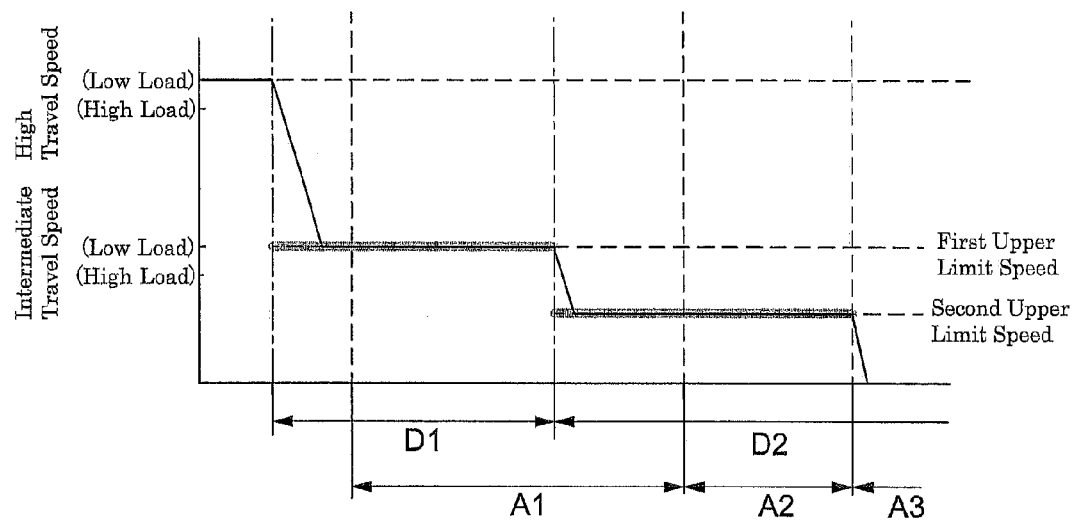
FIG. 9 is a time chart which shows changes in the target travel speed of the article transport vehicle (high speed, low load)

As shown in FIG. 9, the vehicle side controller H1 changes the upper speed limit for the target travel speed to the first upper limit speed if and when the interfering object enters the area D1 and the remote approach information is transmitted from the ground side controller H2, and maintains the upper speed limit for the target travel speed at the first upper limit speed if and when the interfering object enters the area A1 and the long distance approach information is transmitted from the sensor controller 16.

In addition, the vehicle side controller H1 changes the upper speed limit for the target travel speed to the second upper limit speed if and when the interfering object enters the area D2 and the neighboring approach information is transmitted from the ground side controller H2, and maintains the upper speed limit speed for the target travel speed at the second upper limit speed if and when the interfering object enters the area A2 and the short distance approach information is transmitted from the sensor controller 16.

Incidentally, subsequently, if and when the interfering object enters the area A3, the sensor controller 16 controls the operation of the electric-power interrupting device 18 to interrupt the electric power to the travel actuating device 7 to cause the article transport vehicle 1 to perform an emergency stop.

Thus, to the vehicle side controller H1, the long distance approach information and intermediate distance approach information are transmitted from the sensor controller 16 whereas the remote approach information and neighboring approach information are transmitted from the external management server H3.

And between the long distance approach information and intermediate distance approach information, the target travel speed is restricted or reduced based on the approach information that is received later of the two. Also between the remote approach information and neighboring approach information, the target travel speed is restricted or reduced based on the approach information that is received later of the two. And between the approach information from the sensor controller 16 and the approach information from the external management server H3, the approach information that leads to the lower upper speed limit is given priority when restricting, or reducing, the target travel speed.

And, as shown in FIG. 8, an interfering object may exist in an area in which the object is hard to detect with the wireless position measuring system 21 or with the interfering object sensor 15.

With such hard-to-detect area chosen as the detection area e, the monitoring camera 20 is provided in order to detect the position of an interfering object which exists in the detection area e.

Thus, even if an interfering object that exists in the detection area e cannot be detected by the wireless position measuring system 21 or by the interfering object sensor 15, the target travel speed for the article transport vehicle 1 can be changed based on the detected information from the monitoring camera 20 as shown in FIGS. 6 and 7.

And changing the target travel speed for the article transport vehicle 1 based on the detected information from the monitoring camera 20 can be performed based firstly on information transmitted to the vehicle side controller H1 through the external management server H3 and the ground side controller H2, and secondly on information that is wirelessly transmitted from the monitoring camera 20 to the sensor controller 16 and that is then transmitted from the sensor controller 16 to the vehicle side controller H1.

Thus, there are two routes for the transmission of the information, which improves the reliability of the target travel speed change.

In addition, in the present embodiment, the wireless position measuring system 21 is configured to perform: a multiple tag position measurement process in which a midpoint between the positions of a pair of wireless tags 22 associated with, or carried by, each worker 2 or by each fork lift truck 3 is calculated and derived as the position of the worker 2 or the fork lift truck 3; and a single tag position measurement process in which the position of one of the pair of wireless tags 22 associated with, or carried by, each worker 2 or by each fork lift truck 3 is calculated and derived as the position of the worker 2 or the fork lift truck 3.

In the single tag position measurement process, of the two wireless tags 22 carried by one interfering object, the position of the wireless tag 22 that is behind the other in the polling order is selected to be the position of the interfering object as the position information for the wireless tag 22 that more accurately reflects the actual position of the moving interfering object (a worker 2 or a fork lift truck 3).

If the positioning wireless signal cannot be received from one of the wireless tags 22 carried by the interfering object of 1, the position of the wireless tag 22 from which the positioning wireless signal can be received is deemed to be the position of the interfering object.

The processes which the external management server H3 performs based on the position measurement process performed by the wireless position measuring system 21 is described next with reference to the flow chart in FIG. 10.

The external management server H3 commands the tag position measuring device 24 of the wireless position measuring system 21 to calculate the positions of the two wireless tags 22 associated with, or carried by, the worker 2 or the fork lift truck 3 (Step #101).

The external management server H3 next commands the wireless position measuring system 21 to measure, as the multiple tag position measurement process, the position of the midpoint of the two wireless tags 22 as the position of the worker 2 or the fork lift truck 3 (Step #102).

And the external management server H3 then calculates a multiple tag determination distance which is the distance between the worker 2 or the fork lift truck 3 and the article transport vehicle 1 based on the measured position of the worker 2 or the fork lift truck 3 (Step #103).

The external management server H3 determines if the multiple tag determination distance is less than or equal to the remote distance and greater than the neighboring distance, or is less than or equal to the neighboring distance (see FIG. 5), and sets the first upper limit speed as a deceleration command speed for the multiple tag determination distance if it is less than or equal to the remote distance and greater than the neighboring distance, and sets the second upper limit speed as the deceleration command speed for the multiple tag determination distance if it is less than or equal to the neighboring distance, and stores it in a temporary memory (Step #104).

The external management server H3 next commands the wireless position measuring system 21 to measure, as the single tag position measurement process, the position of one of the two wireless tags 22 as the position of the worker 2 or the fork lift truck 3 (Step #105).

And the external management server H3 then calculates a single tag determination distance which is the distance between the worker 2 or the fork lift truck 3 and the article transport vehicle 1 based on the measured position of the worker 2 or the fork lift truck 3 (Step #106).

The external management server H3 determines if the single tag determination distance is less than or equal to the remote distance and greater than the neighboring distance, or is less than or equal to the neighboring distance (see FIG. 5), and sets the first upper limit speed as a deceleration command speed for the single tag determination distance if it is less than or equal to the remote distance and greater than the neighboring distance, and sets the second upper limit speed as the deceleration command speed for the single tag determination distance if it is less than or equal to the neighboring distance, and stores it in a temporary memory (Step #107).

The external management server H3 then commands the deceleration command speed that is the lower speed between the deceleration command speed that is calculated at Step #104, is stored in the temporary memory, and corresponds to the multiple tag determination distance, and the deceleration command speed that is calculated at Step #107, is stored in the temporary memory, and corresponds to the single tag determination distance (Step #108).

The external management server H3 determines whether there is any object for which position measurement has not been completed in the cycle among the interfering objects (that is, all the workers 2 and fork lift trucks 3) that exist in the detection target area E (Step #109), and performs the processes of steps #101-#108 until position measurement is competed for all the interfering objects.

Figure 10:
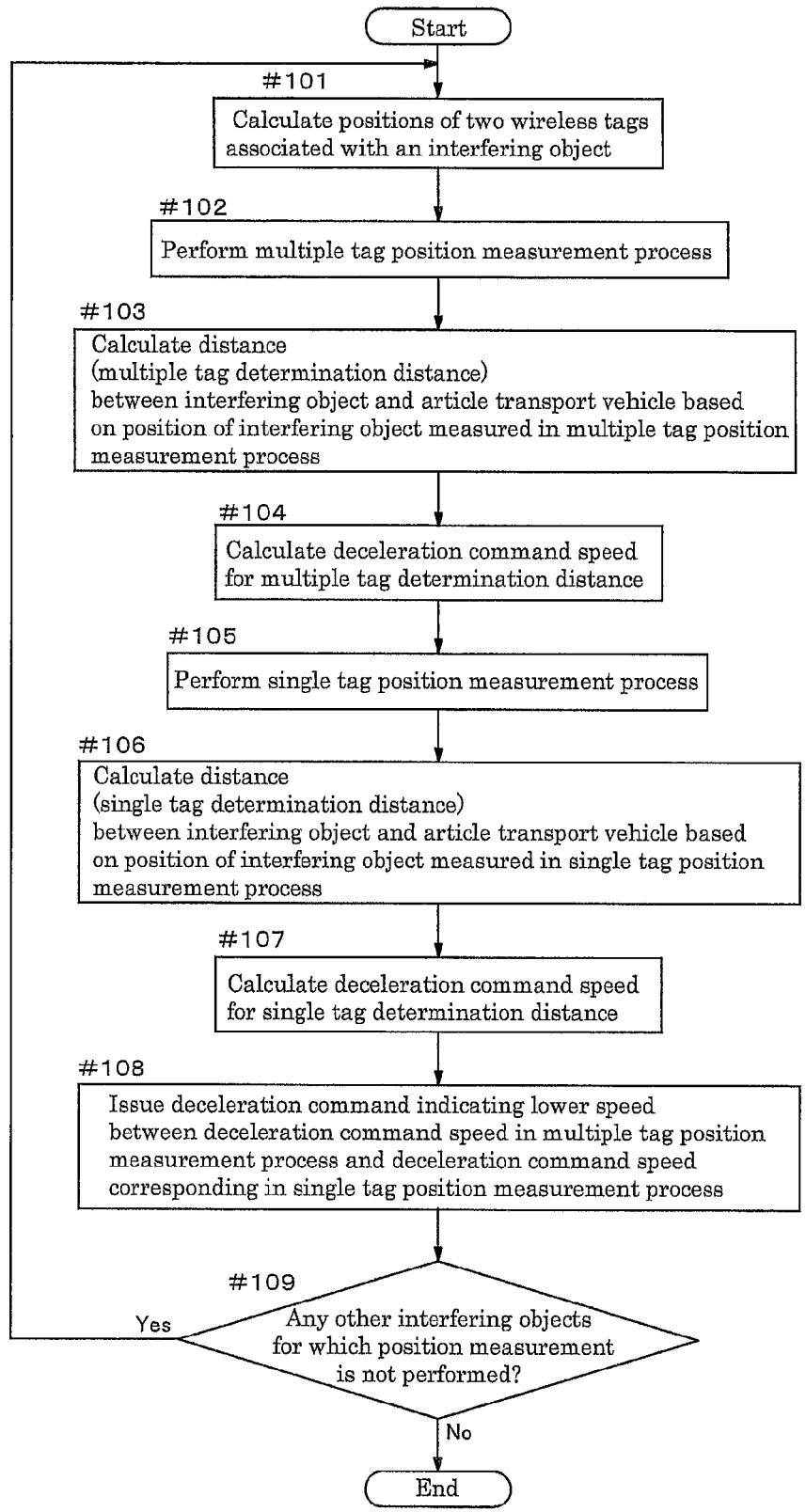
FIG. 10 is a flow chart of a process which an external managing device performs based on a position measurement process of the first embodiment.

And the external management server H3 is configured to repeat the operations in the flow chart in FIG. 10 from the beginning when position measurement is completed for all the interfering objects.

In the present embodiment, the travel of the article transport vehicle is made safer by providing two ways to determine the deceleration command based on the position of the interfering object (the worker 2 or the fork lift truck 3) measured based on the position of the wireless tags 22 as described above.

Second Embodiment

The second embodiment in accordance with the present invention is described next with reference to FIGS. 11 and 12.

The second embodiment is different from the first embodiment only in the processes that the external management server H3 performs based on the position measurement process performed by the wireless position measuring system 21. Accordingly, only the features that are different from those in the first embodiment are described here and descriptions for the features that are identical to those in the first embodiment are omitted.

Specifically, the external management server H3 commands the tag position measuring device 24 of the wireless position measuring system 21 to calculate the positions of the two wireless tags 22 associated with, or carried by, the worker 2 or the fork lift truck 3 (step #201).

The external management server H3 next commands the wireless position measuring system 21 to measure, as the multiple tag position measurement process, the position of the midpoint of the two wireless tags 22 as the position of the worker 2 or the fork lift truck 3 (Step #202).

And the external management server H3 then calculates the multiple tag determination distance which is the distance between the worker 2 or the fork lift truck 3 and the article transport vehicle 1 based on the measured position of the worker 2 or the fork lift truck 3, and stores the multiple tag determination distance in the temporary memory (Step #203).

The external management server H3 next commands the wireless position measuring system 21 to measure, as the single tag position measurement process, the position of one of the two wireless tags 22 as the position of the worker 2 or the fork lift truck 3 (Step #204).

And the external management server H3 then calculates the single tag determination distance which is the distance between the worker 2 or the fork lift truck 3 and the article transport vehicle 1 based on the measured position of the worker 2 or the fork lift truck 3, and stores the single tag determination distance in the temporary memory (Step #205).

The external management server H3 determines whether both of the multiple tag determination distance which was calculated at Step #203 and was stored in the temporary memory and the single tag determination distance which was calculated at Step #205 and was stored in the temporary memory are less than or equal to the low speed distance (Step #206).

If it is determined, at Step #206, that both of the multiple tag determination distance and the single tag determination distance are less than or equal to the low speed distance (i.e., "Yes" at Step #206), then the external management server H3 calculates the deceleration command speed that corresponds to the shorter distance between the multiple tag determination distance and the single tag determination distance, and stores the deceleration command speed in the temporary memory (Step #207).

If it is determined, at Step #206, that both of the multiple tag determination distance and the single tag determination distance are not less than or equal to the low speed distance (i.e., "No" at Step #206), then the external management server H3 next determines whether one of the multiple tag determination distance and the single tag determination distance is less than or equal to the low speed distance (Step #208).

If it is determined, at Step #208, that one of the multiple tag determination distance and the single tag determination distance is less than or equal to the low speed distance (i.e., "Yes" at Step #208), then the external management server H3 calculates the deceleration command speed that corresponds to the determination distance that is less than or equal to the low speed distance, and stores the deceleration command speed in the temporary memory (Step #209).

Subsequent to the process at Step #207 or Step #209, the external management server H3 issues a deceleration command specifying the deceleration command speed which was calculated and stored in the temporary memory (Step #210).

The external management server H3 determines whether there is any object for which position measurement has not been completed in the cycle among the interfering objects (that is, all the workers 2 and fork lift trucks 3) that exist in the detection target area E (Step #211), and performs the processes of steps #201-#210 until position measurement is competed for all the interfering objects.

Figure 11:
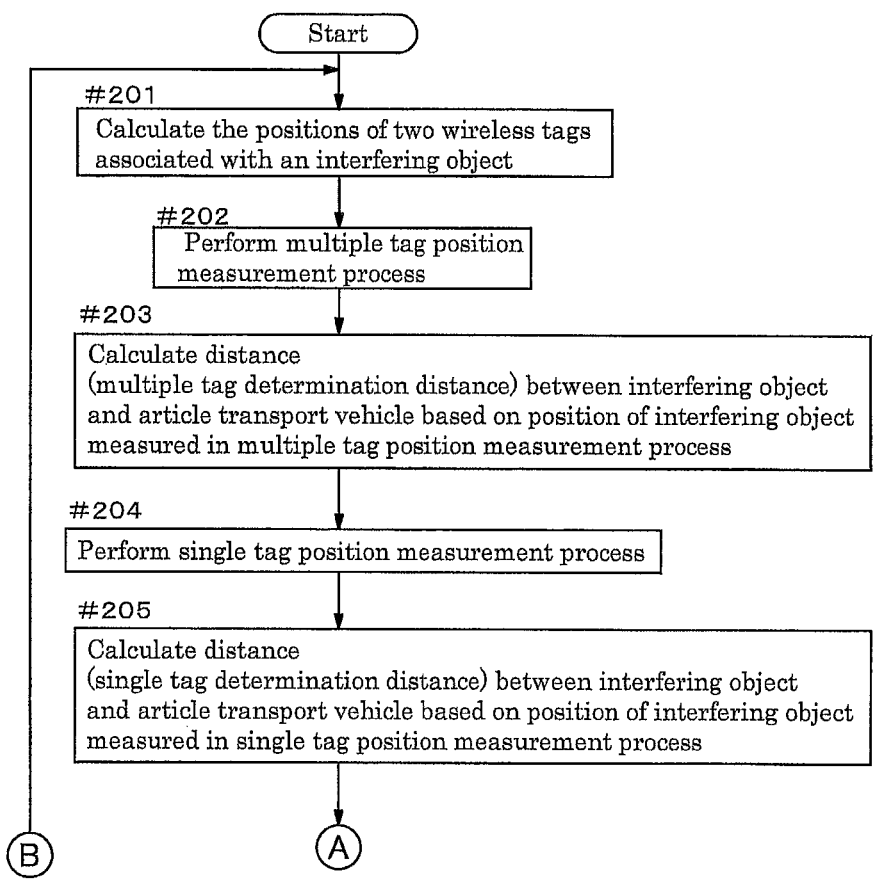
FIG. 11 is a flow chart of a process which the external managing device performs based on the position measurement process of the second embodiment.
Figure 12:
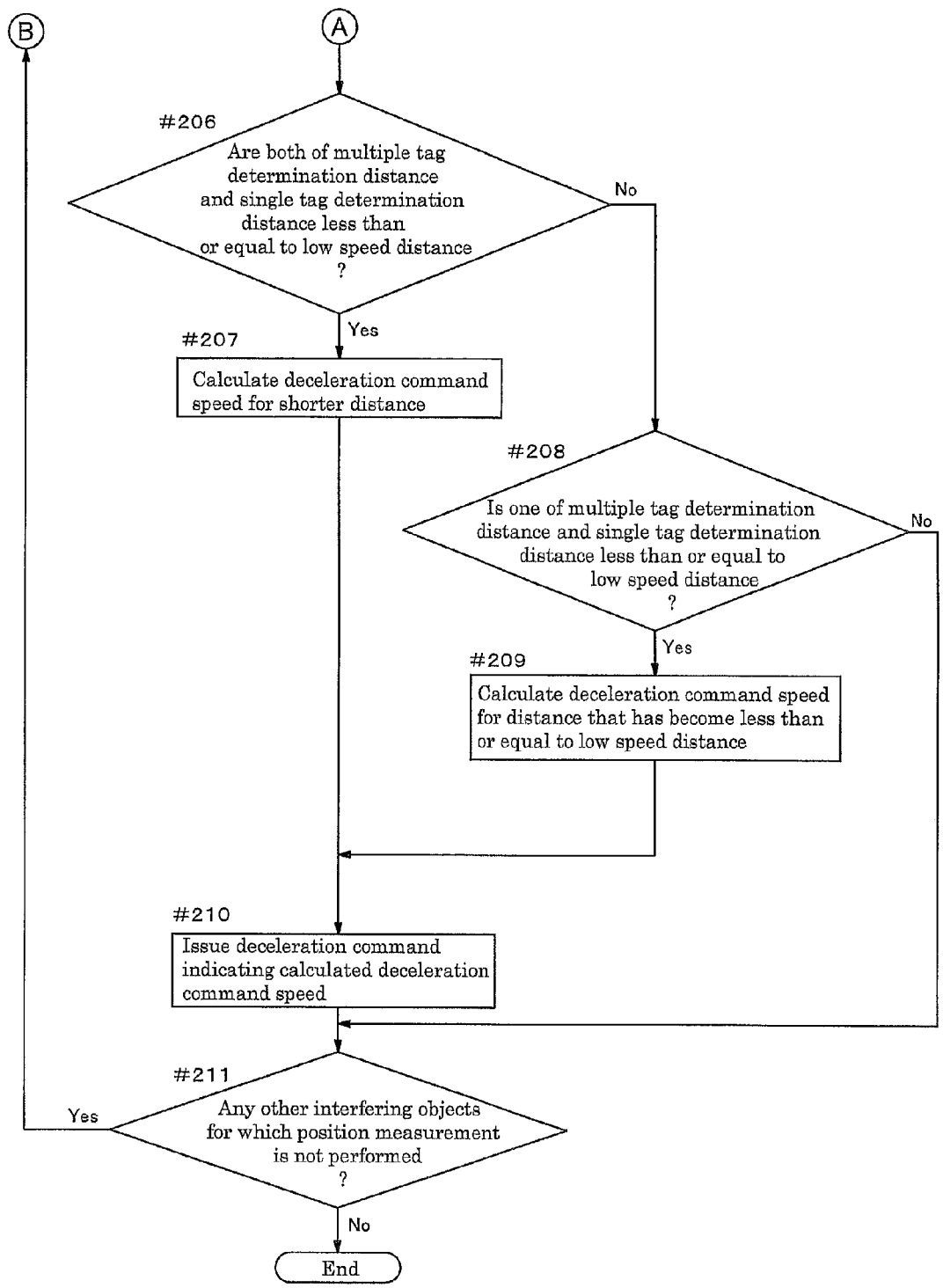
FIG. 12 is a flow chart of a process which the external managing device performs based on the position measurement process of the second embodiment.

And the external management server H3 is configured to repeat the operations in the flow chart in FIGS. 11 and 12 from the beginning when position measurement is completed for all the interfering objects.

In the present embodiment, the travel of the article transport vehicle is made safer by providing two ways to determine the distance between an interfering object (the worker 2 or the fork lift truck 3) and the article transport vehicle 1 based on the position of the interfering object measured based on the position of the wireless tag 22 as described above.

Alternative Embodiments (1) In the first or second embodiment described above, the facility is configured to reduce the normal travel speed to a lower speed based on the travel condition.

However, for example, same normal travel speed may be used for a straight path portion and for a curved path portion in the travel path, and same normal travel speed may be used for the high load condition and the low load condition so that the facility may be configured not to reduce the normal travel speed to a lower speed even if the travel condition changes.

(2) In the first or second embodiment described above, the auxiliary travel controller for controlling the operation of the travel actuating device 7 based on the detected information from the presence detector is incorporated within the presence detector. However, the auxiliary travel controller may be provided independently and separately from the presence detector. Further, the vehicle side travel controller may perform the function of the auxiliary travel controller.

(3) In the first or second embodiment described above, the small area detector (position detector 19) is configured to issue the deceleration command to the vehicle side travel controller of the article transport vehicle 1 if and when the distance from the article transport vehicle 1 to the interfering object becomes less than or equal to the low speed distance, based on the detected position information of an interfering object and the travel position information of the article transport vehicle 1, and to transmit the interfering object information to the presence detector if and when the distance from the article transport vehicle 1 to the interfering object becomes less than or equal to the deceleration distance.

However, the small area detector (position detector 19) may be configured to perform only one of the issuance of the deceleration command to the vehicle side travel controller and the transmission of the interfering object information to the presence detector.

The small area detector (position detector 19) receives the travel position information for the article transport vehicle 1 by wireless transmission from the travel position detector 13 in the embodiments described above. However, the travel position information for the article transport vehicle 1 may be obtained through position detection of the article transport vehicle 1 by the small area detector.

(4) In the first or second embodiment described above, the large area detector and the small area detector are provided as the position detectors 19.

However, only one of the large area detector and the small area detector may be provided as the position detector 19.

In addition, the detection target area E for the large area detector (position detector 19) is defined such as to include all of the areas where the travel path L is installed.

However, the detection target area E may be defined to include only a part of area where the travel path L is installed.

(5) In the first or second embodiment described above, the low speed distance is defined to be the same distance for different kinds of interfering objects.

However, for example, the facility may be configured such that the deceleration command is not issued even if the distance from the article transport vehicle 1 to the interfering object becomes less than or equal to the remote distance or the long distance for an interfering object that moves slowly and for an interfering object that would have only a small impact even if it interferes, or contacts, with the article transport vehicle 1 and such that the deceleration command is not issued only if the distance from the article transport vehicle 1 to the interfering object becomes less than or equal to the intermediate distance or the neighboring distance.

Thus, the facility may be configured so that the low speed distance may be set to be different depending on the kind of the interfering object.

(6) In the first or second embodiment described above, the low speed distance for when an interfering object is located forwardly of the article transport vehicle 1 in the travel direction is defined to be different from the low speed distance for when an interfering object is located rearwardly of the article transport vehicle 1 in the travel direction.

However, these low speed distances may be defined to be the same.

(7) In the first or second embodiment described above, the reduced travel speed to which the target travel speed is changed when the deceleration command is issued from the external managing device and the reduced travel speed to which the target travel speed is changed when the interfering object is detected by the presence detector are defined to be the same speed (the first upper limit speed or the second upper limit speed).

However, these reduced travel speeds may be defined to be different.

In addition, although the first upper limit speed and the second upper limit speed are defined as the reduced travel speed in the above-described embodiments, three or more upper limit speeds (e.g., a third upper limit speed) or only one upper limit speed (e.g., first upper limit speed) may be defined as the upper limit speed.

In addition, a stop speed for stopping the article transport vehicle 1 may be defined as the reduced travel speed to which the target travel speed is changed when a deceleration command is issued from the external managing device.

Incidentally, the operation of the travel actuating device 7 may be controlled to match the target travel speed for the article transport vehicle 1 with the stop speed when the target travel speed is changed to the stop speed.

Or, the operation of the electric-power interrupting device 18 may be controlled to match the target travel speed of the article transport vehicle 1 with the stop speed.

And in the embodiments described above, the first upper limit speed, the second upper limit speed, and the stop speed are defined as the reduced travel speed to which the target travel speed is changed when an interfering object is detected by the presence detector.

However, only one or two of these three speeds may be defined.

Or, four or more speeds may be defined, for example, by defining a third upper limit speed.

(8) In the first or second embodiment described above, the monitoring camera 20 is provided as the small area detector.

However, other detecting devices, such as a mat switch may be provided as the small area detector.

While an Axi-Vision camera (a three-dimensional distance-mapping imaging camera) is provided as the monitoring camera 20, other cameras, such as, a stereoscopic camera, or an infrared camera may be provided as the monitoring camera 20.

(9) In the first or second embodiment described above, an example is described in which UWB wireless tags configured to transmit UWB wireless signals as wireless signals for position measurement and UWB receivers configured to communicate with these tags are provided as the large area detector.

Instead, any of the various wireless communication systems such as, wireless signals that are in compliance with such a telecommunications standard as IEEE802.11n as wireless signals for position measurement, wireless tags configured to transmit wireless signals through wireless LAN, and a receiver configured to communicate with these tags may be adapted.

In the embodiment described above, an example is described in which the wireless tags are active tags.

However, as wireless tags, various kinds of wireless tags, such as hybrid tags that are used in combination with passive RFID tags may be adapted.

(10) In the first or second embodiment described above, the position detector 19 is configured to transmit interfering object presence information to the presence detector.

However, the position detector 19 may be configured to transmit the information directly to the vehicle side travel controller without communicating the information via the ground side travel controller.

Note that, in this case, the vehicle side travel controller is configured to change the target travel speed from the normal travel speed to the reduced travel speed if and when interfering object presence information is received from the position detector 19 while the target travel speed is set to a normal travel speed.

(11) In the first or second embodiment described above, one article transport vehicle is provided in the article transport facility.

However, two or more article transport vehicles may be provided in the article transport facility.

In addition, while an example is described in which the article transport vehicle is the kind that operates without a human operator therein. However, the article transport vehicles only need to be able to travel autonomously, and thus may be of a kind that is configured to operate with a human operator in it.

In addition, apart from a pallet and goods and things supported by the pallet, an article to be transported may be a carton case, a container, or living things, such as an animal including human.

(12) In the first or second embodiment described above, the detection target area E consists of a single area.

However, the detection target area E may consists of a plurality of areas where the corresponding number of groups of base units 23 are provided with each group provided to an area (four base units 23 for each area in the embodiments described above).

In addition, the shape of the detection target area E and the installation locations of the base units 23 in the detection target area E may be suitably changed.

For example, the detection target area E does not have to be rectangular as in the embodiments described above but may be circular instead.

Also, the installing locations of the base units 23 do not have to be along the peripheral edge of the detection target area E as in the embodiments described above.

Instead, the base units 23 may be installed within the detection target area E.

And three or the five or more base units 23 may be provided to the detection target area E.

Although a single detection area e is defined in the embodiments described above, a plurality of small area detectors may be provided and a plurality of detection areas e may be defined.

(13) In the first or second embodiment described above, a facility, in which two wireless tags 22 are carried by each worker 2 and in which two wireless tags 22 are carried by the fork lift truck 3, is described.

However, three or more wireless tags 22 may be carried by each worker 2 and in which three or more wireless tags 22 may be carried by the fork lift truck 3.

In this case, in the multiple tag position measurement process described above, the position that is obtained by averaging the positions of the wireless tags 22 assigned to the worker 2 or the fork lift truck 3 may be calculated and derived as the position of the worker 2 or the fork lift truck 3.

And in the single tag position measurement process described above, the position of one of the wireless tags 22 assigned to the worker 2 or the fork lift truck 3 may be calculated and derived as the position of the worker 2 or the fork lift truck 3.

(14) In the first or second embodiment described above, a configuration in which the position measurement process is repeatedly performed at every predetermined cycle is described.

However, the cycle in which the position measurement process is performed may be changed flexibly depending on the number of the wireless tags 22 that exist in the detection target area E.

More specifically, if T [sec] is the amount of time required to take a measurement on one wireless tag 22, and if n is the number of the wireless tags 22 that exist in the detection target area E, then the cycle may be set to be equal to T×n [sec].

(15) In the first and second embodiment described above, all four base units 23 are assigned to one detection target area E.

However, for example, the detection target area E may be divided into a plurality of areas.

And a group of two or more base units 23 may be assigned to each of the plurality of areas.

In this case, the groups of base units 23 assigned to the respective areas may perform polling of the wireless tags 22 simultaneously.

(16) In the embodiments described above, an example is described in which the low speed areas are defined in advance as semi-circular areas (area D1 and area D2 in FIG. 5) which share the same center at the position of the article transport vehicle 1, which spread forwardly of the article transport vehicle 1, and whose radii are equal to the predetermined low speed distances.

However, the low speed areas are not limited to the areas described above. For example, as shown in FIG. 13, the low speed areas defined in advance in the external management server H3 may be fan-shaped that spreads laterally toward the front from the front of the article transport vehicle 1.

Figure 13:
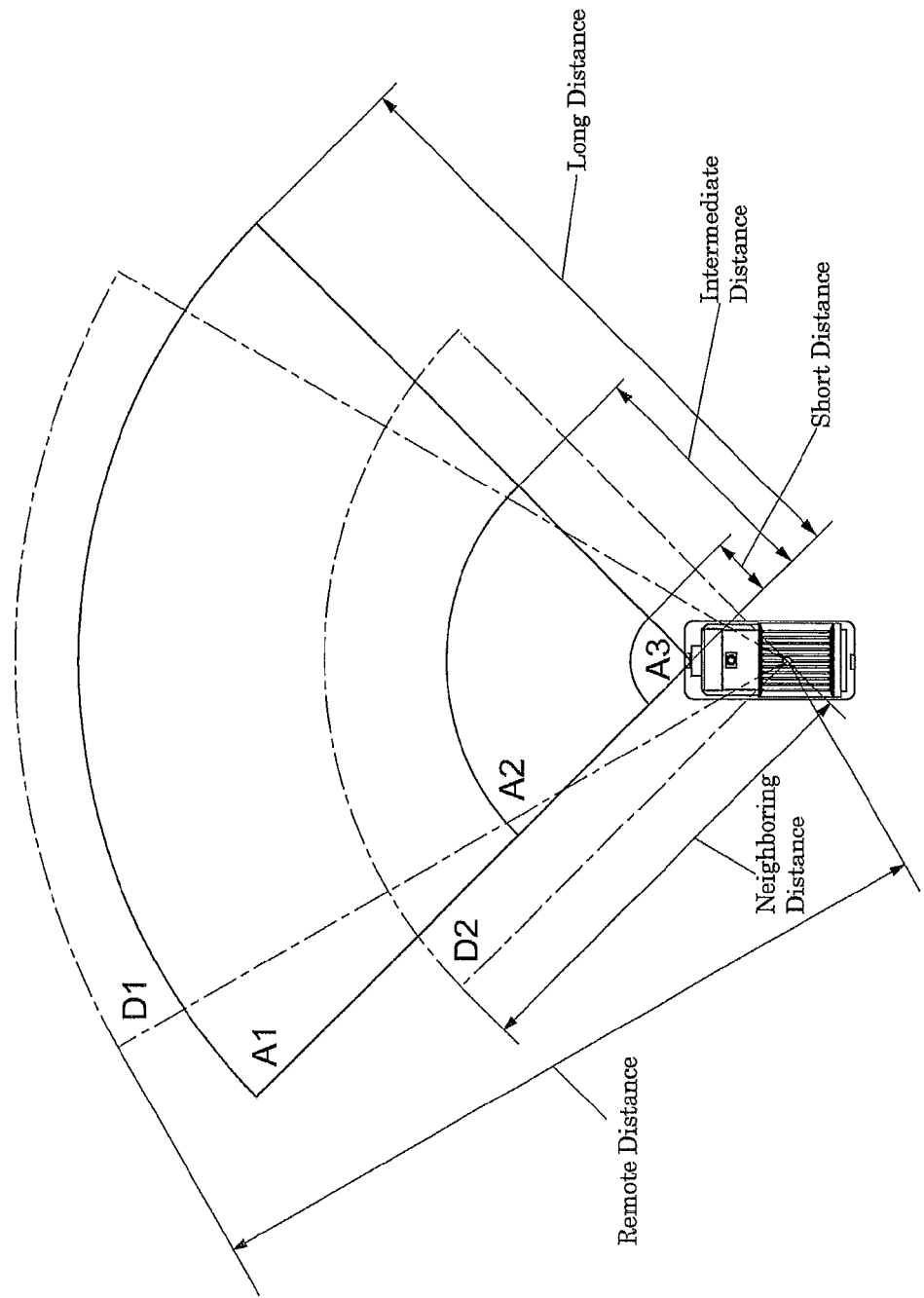
FIG. 13 shows areas used in changing the target travel speed of the article transport vehicle of an alternative embodiment.

In FIG. 13, the low speed area (area D2) whose radius is equal to the neighboring distance is defined as a fan-shaped area that spans 45 degrees to each side from an imaginary line extending straight forward from the article transport vehicle 1 (i.e., with the central angle of 90 degrees) and that has its center at a reference position located near the center of the article transport vehicle 1.

And the low speed area (area D1) whose radius is equal to the neighboring distance is defined as a fan-shaped area that spans 30 degrees to each side from the imaginary line extending straight forward from the article transport vehicle 1 (i.e., with the total angle of 60 degrees) and that has its center at the reference position located near the center of the article transport vehicle 1.

In addition, the angle by which the fan-shaped area spread is not limited to the values mentioned above but can be defined suitably.

Also, while, in FIG. 13, the area D2 is defined to have a greater angle by which the fan-shaped area spreads to each side from the imaginary line extending straight forward from the article transport vehicle 1 than the area D1, the area D1 may be defined to have a greater angle by which the fan-shaped area spreads to each side from the imaginary line extending straight forward from the article transport vehicle 1 than the area D2.

In addition, the low speed areas in accordance with an alternative embodiment may have its outer edge so shaped that the distance from the article transport vehicle 1 to the outer edge is at its maximum at the point on the outer edge that is located straight forward from the article transport vehicle 1 and decreases outwardly in either lateral direction.

Figure 14:
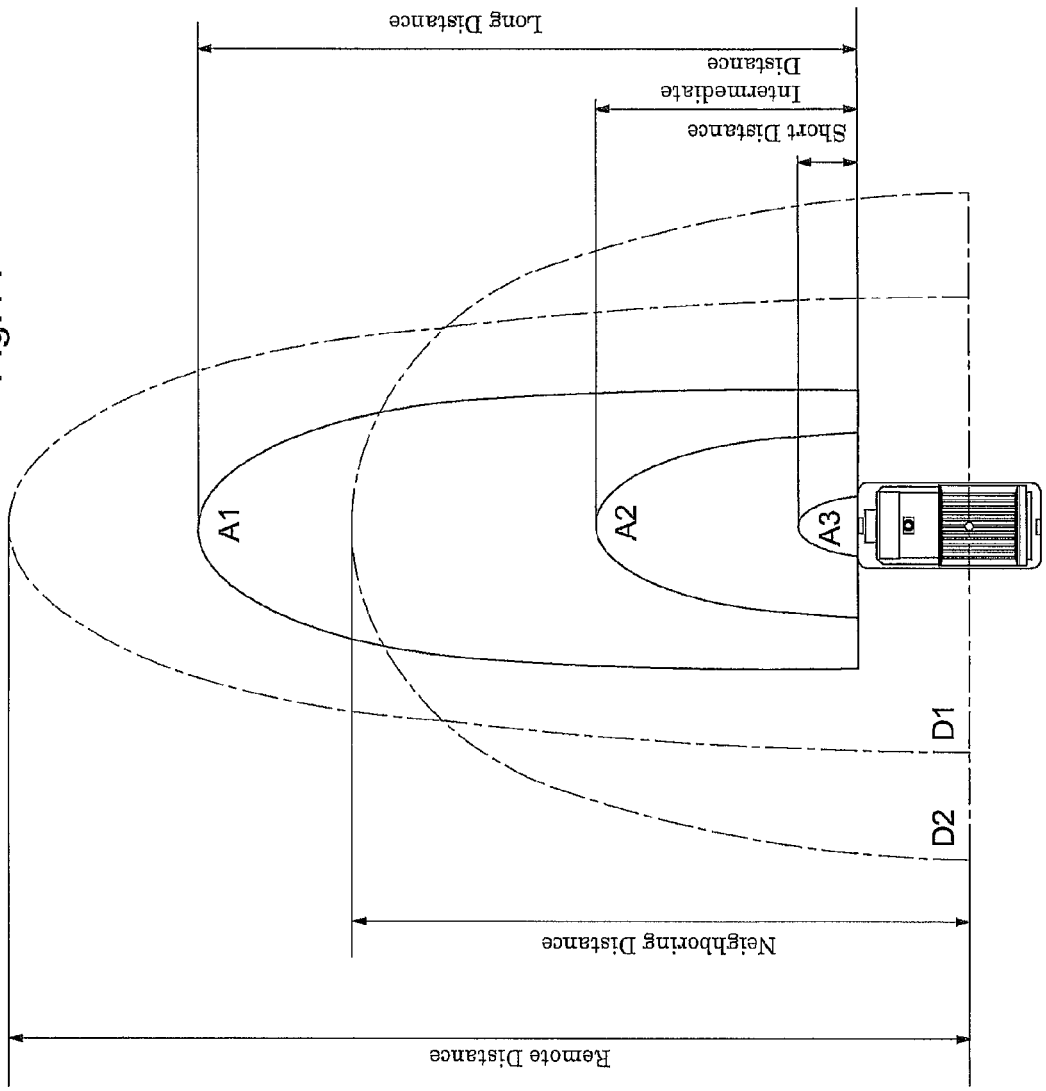
FIG. 14 shows areas used in changing the target travel speed of the article transport vehicle in accordance with yet another alternative embodiment.

That is, as shown in FIG. 14, the low speed areas may consist, for example, of an area D1 which is of a half-elliptical shape or an elongated circle which has its center at the article transport vehicle 1 and with its major axis having the length of the remote distance (25 m) and extending in the travel direction of the article transport vehicle 1 and an area D2 which is of a half-elliptical shape or an elongated circle having its center at the article transport vehicle 1 and with its major axis having the length of the neighboring distance (15 m) and extending in the travel direction of the article transport vehicle 1.

In addition, in FIG. 14, the distance from the article transport vehicle 1 to the outer edge of the area D1 is less than the distance to the outer edge of the area D2 at positions near each lateral side of the article transport vehicle 1.

However, the distance from the article transport vehicle 1 to the outer edge of the area D1 may be greater than the distance to the outer edge of the area D2 at positions near each lateral side of the article transport vehicle 1.

That is, the areas may be so shaped that the greater the length of major axis is, the greater the length of the minor axis is.

Further, the areas (area A1, area A2, and area A3) corresponding to the deceleration distances set by the sensor controller 16 and the camera control portion (not shown) may also be shaped such that the distance from the article transport vehicle 1 to the outer edge is at its maximum at the point on the outer edge that is located straight forward from the article transport vehicle 1 and decreases outwardly in either lateral direction from the straight forward direction.

That is, for example, as shown in FIG. 14, the following three areas may be defined: an area A1 which is of a half-elliptical shape or an elongated circle having its center at the interfering object sensor 15 with its major axis having its length equal to the long distance (20 m) and extending along the travel direction of the article transport vehicle 1, an area A2 which is of a half-elliptical shape or an elongated circle having its center at the interfering object sensor 15 with its major axis having its length equal to the intermediate distance (8 m) and extending along the travel direction of the article transport vehicle 1 and, an area A3 which is of a half-elliptical shape or an elongated circle having its center at the interfering object sensor 15 with its major axis having its length equal to the short distance (2 m) and extending along the travel direction of the article transport vehicle 1.

In addition, the areas A1, A2, and A3 may be defined such that the greater the length of the major axis is, the shorter the length of the minor axis is, as with the areas D1, and D2.

In addition, in FIG. 14, each of the areas A1, A2, A3, D1, and D2 is of a half-elliptical shape or an elongated circle whose major axis extends in the travel direction of the article transport vehicle 1.

However, shapes other than the half-elliptical shape or elongated circle described above may be adapted as long as the shapes are such that the distance from the article transport vehicle 1 to the outer edge is at its maximum at the point on the outer edge that is located straight forward from the article transport vehicle 1 and decreases outwardly in either lateral direction from the straight forward direction.

In addition, it is possible to define the areas so as to have: a mixture of semicircular areas and fan-shaped areas shown in FIG. 13; a mixture of semicircular areas and areas having a half-elliptical shape or an elongated circle shown in FIG. 14; a mixture of semicircular areas, fan-shaped areas shown in FIG. 13, and areas having a half-elliptical shape or an elongated circle shown in FIG. 14; or a mixture of fan-shaped areas shown in FIG. 13 and areas having a half-elliptical shape or an elongated circle shown in FIG. 13.

What is claimed is:

1. An article transport facility comprising:
an article transport vehicle configured to travel by an operation of a travel actuating device and along a travel path extending by way of a plurality of article transfer locations;
a ground side travel controller which issues a travel command to the article transport vehicle;
a vehicle side travel controller which is provided to the article transport vehicle, and which controls operation of the travel actuating device based on detected information from a travel position detector which detects a travel position of the article transport vehicle,
wherein the vehicle side travel controller is configured to control operation of the travel actuating device based on travel position information detected by the travel position detector and travel command information from the ground side travel controller in order to cause the article transport vehicle to travel along the travel path toward a target travel position at a target travel speed;
a position detector provided on a ground side for detecting a position of an interfering object that exists in a detection target area which includes an area in which the travel path is installed; and
an external managing device which issues a deceleration command to the article transport vehicle if and when the position of the interfering object with respect to the article transport vehicle is in a low speed area, which is determined in advance with respect to the position of the article transport vehicle, based on position information of the interfering object from the position detector and travel position information of the article transport vehicle;
wherein:
the vehicle side travel controller is configured to change the target travel speed from a normal travel speed to a reduced travel speed which is less than the normal travel speed if and when the deceleration command is issued from the external managing device while the target travel speed is set to the normal travel speed,
the position detector is a wireless position measuring device which includes wireless tags configured to output positioning wireless signals which are wireless signals for position measurement, a plurality of receivers configured to receive the positioning wireless signals from the wireless tags that exist in the detection target area, and a position calculation portion which calculates positions of the wireless tags in the detection target area based on received information from the plurality of receivers wherein the wireless position measuring device performs a position measurement process in which the position of the interfering object in the detection target area is calculated,
a plurality of the wireless tags are provided to each of the interfering objects,
each of the receivers is configured to receive the positioning wireless signals from only one of the wireless tags at one time, and to receive the positioning wireless signals from the plurality of wireless tags such that the receptions of the positioning wireless signals are staggered over time,
the wireless position measuring device is configured to measure the positions of the interfering objects at every processing time by repeatedly performing the position measurement process at every processing time, and to perform, as the position measurement process, both of a multiple tag position measurement process in which the position of each of the interfering objects is calculated based on a position of each of the plurality of wireless tags associated with each of the interfering objects, and a single tag position measurement process in which the position of each of the interfering objects is calculated to be a position of one of the plurality of wireless tags that are associated with the each of the interfering objects,
the external managing device is configured to set the deceleration command such that the shorter a distance between the article transport vehicle and the interfering object is, the lower a speed indicated by the deceleration command is, and
if the deceleration command set for a distance, between the article transport vehicle and the interfering object, calculated based on the position of the interfering object calculated in the multiple tag position measurement process is different from the deceleration command set for a distance, between the article transport vehicle and the interfering object, calculated based on the position of the interfering object calculated in the single tag position measurement process, then the external managing device is configured to select and issue the deceleration command that indicates a slower speed.

2. The article transport facility as defined in claim 1, wherein the low speed area is defined to be a fan-shaped area whose radius is equal to a low speed distance defined in advance and which has a center at the position of the article transport vehicle and spreads forwardly of the article transport vehicle in plan view, and
wherein the external managing device is configured to transmit the deceleration command to the article transport vehicle if and when a distance from the article transport vehicle to the interfering object becomes less than or equal to the low speed distance.

3. The article transport facility as defined in claim 1, wherein provided as the position detector are a large area detector for detecting the position of the interfering object in an entire area of the detection target area, and a small area detector for detecting the position of the interfering object in an area in the detection target area in which detecting the position of an interfering object with the large area detector is difficult.

4. The article transport facility as defined in claim 1, wherein the vehicle side travel controller is configured to change the normal travel speed to a lower speed based on a travel condition, and to maintain the target travel speed at the normal travel speed even if the deceleration command is issued from the ground side travel controller while the target travel speed is set to the normal travel speed if the normal travel speed is less than the reduced travel speed.

5. The article transport facility as defined in claim 1, wherein the external managing device is configured to be able to determine a kind of interfering object based on detected information from the position detector, and to set a predefined low speed distance differently depending on the kind of interfering object.

6. The article transport facility according to claim 1, wherein:
the article transport vehicle includes a presence detector for detecting a presence of the interfering object located forwardly in the travel direction of the article transport vehicle,
the vehicle side travel controller is configured to change the travel speed of the article transport vehicle from the normal travel speed to a reduced travel speed which is less than the normal travel speed if and when an interfering object is detected by the presence detector while the target travel speed is set to the normal travel speed, and
the position detector is configured to detect an interfering object at a position where it is difficult to detect the interfering object with the presence detector.

7. The article transport facility as defined in claim 1, wherein the external managing device is configured to be able to set a low speed distance defined in advance for when the interfering object is located forwardly of the article transport vehicle in the travel direction to be different from the low speed distance defined in advance for when the interfering object is located rearwardly of the article transport vehicle in the travel direction.

8. An article transport facility comprising:
an article transport vehicle configured to travel by an operation of a travel actuating device and along a travel path extending by way of a plurality of article transfer locations;
a ground side travel controller which issues a travel command to the article transport vehicle;
a vehicle side travel controller which is provided to the article transport vehicle, and which controls operation of the travel actuating device based on detected information from a travel position detector which detects a travel position of the article transport vehicle,
wherein the vehicle side travel controller is configured to control operation of the travel actuating device based on travel position information detected by the travel position detector and travel command information from the ground side travel controller in order to cause the article transport vehicle to travel along the travel path toward a target travel position at a target travel speed;
a position detector provided on a ground side for detecting a position of an interfering object that exists in a detection target area which includes an area in which the travel path is installed; and
an external managing device which issues a deceleration command to the article transport vehicle if and when the position of the interfering object with respect to the article transport vehicle is in a low speed area, which is determined in advance with respect to the position of the article transport vehicle, based on position information of the interfering object from the position detector and travel position information of the article transport vehicle;
wherein:
the vehicle side travel controller is configured to change the target travel speed from a normal travel speed to a reduced travel speed which is less than the normal travel speed if and when the deceleration command is issued from the external managing device while the target travel speed is set to the normal travel speed, the position detector is a wireless position measuring device which includes wireless tags that are provided to the interfering object and that are configured to output positioning wireless signals which are wireless signals for position measurement, a plurality of receivers configured to receive the positioning wireless signals from the wireless tags that exist in the detection target area, and a position calculation portion which calculates positions of the wireless tags in the detection target area based on received information from the plurality of receivers wherein the wireless position measuring device performs a position measurement process in which the position of the interfering object in the detection target area is calculated,
a plurality of the wireless tags are provided to each of the interfering objects,
the receiver is configured to receive the positioning wireless signal from only one of the wireless tags at one time and to receive the positioning wireless signals from the plurality of wireless tags such that the receptions of the positioning wireless signals are staggered over time,
the wireless position measuring device is configured to measure the positions of the interfering objects at every processing time by repeatedly performing the position measurement process at every processing time, and to perform, as the position measurement process, both of a multiple tag position measurement process in which the position of each of the interfering objects is calculated based on a position of each of the plurality of wireless tags associated with each of the interfering objects, and a single tag position measurement process in which the position of each of the interfering objects is calculated to be a position of one of the plurality of wireless tags that are associated with the each of the interfering objects, and
the external managing device is configured to issue the deceleration command if and when at least one of: a distance, between the article transport vehicle and the interfering object, calculated based on the position of the interfering object calculated in the multiple tag position measurement process; and a distance, between the article transport vehicle and the interfering object, calculated based on the position of the interfering object calculated in the single tag position measurement process, becomes less than or equal to a distance from the article transport vehicle to an outer edge of the low speed area.

9. The article transport facility as defined in claim 8, wherein the low speed area is defined to be a fan-shaped area whose radius is equal to a low speed distance defined in advance and which has a center at the position of the article transport vehicle and spreads forwardly of the article transport vehicle in plan view, and
wherein the external managing device is configured to transmit the deceleration command to the article transport vehicle if and when a distance from the article transport vehicle to the interfering object becomes less than or equal to the low speed distance.

10. The article transport facility as defined in claim 8, wherein provided as the position detector are a large area detector for detecting the position of the interfering object in an entire area of the detection target area, and a small area detector for detecting the position of the interfering object in an area in the detection target area in which detecting the position of an interfering object with the large area detector is difficult.

11. The article transport facility as defined in claim 8, wherein the vehicle side travel controller is configured to change the normal travel speed to a lower speed based on a travel condition, and to maintain the target travel speed at the normal travel speed even if the deceleration command is issued from the ground side travel controller while the target travel speed is set to the normal travel speed if the normal travel speed is less than the reduced travel speed.

12. The article transport facility as defined in claim 8, wherein the external managing device is configured to be able to determine a kind of interfering object based on detected information from the position detector, and to set a predefined low speed distance differently depending on the kind of interfering object.

13. The article transport facility according to claim 8, wherein:
the article transport vehicle includes a presence detector for detecting a presence of the interfering object located forwardly in the travel direction of the article transport vehicle,
the vehicle side travel controller is configured to change the travel speed of the article transport vehicle from the normal travel speed to a reduced travel speed which is less than the normal travel speed if and when an interfering object is detected by the presence detector while the target travel speed is set to the normal travel speed, and
the position detector is configured to detect an interfering object at a position where it is difficult to detect the interfering object with the presence detector.

14. The article transport facility as defined in claim 8, wherein the external managing device is configured to be able to set a low speed distance defined in advance for when the interfering object is located forwardly of the article transport vehicle in the travel direction to be different from the low speed distance defined in advance for when the interfering object is located rearwardly of the article transport vehicle in the travel direction.

15. An article transport facility comprising:
an article transport vehicle configured to travel by an operation of a travel actuating device and along a travel path extending by way of a plurality of article transfer locations;
a ground side travel controller which issues a travel command to the article transport vehicle;
a vehicle side travel controller which is provided to the article transport vehicle, and which controls operation of the travel actuating device based on detected information from a travel position detector which detects a travel position of the article transport vehicle,
wherein the vehicle side travel controller is configured to control operation of the travel actuating device based on travel position information detected by the travel position detector and travel command information from the ground side travel controller in order to cause the article transport vehicle to travel along the travel path toward a target travel position at a target travel speed;
a position detector provided on a ground side for detecting a position of an interfering object that exists in a detection target area which includes an area in which the travel path is installed; and
an external managing device which issues a deceleration command to the article transport vehicle if and when the position of the interfering object with respect to the article transport vehicle is in a low speed area, which is determined in advance with respect to the position of the article transport vehicle, based on position information of the interfering object from the position detector and travel position information of the article transport vehicle;
wherein:
the vehicle side travel controller is configured to change the target travel speed from a normal travel speed to a reduced travel speed which is less than the normal travel speed if and when the deceleration command is issued from the external managing device while the target travel speed is set to the normal travel speed,
the article transport vehicle includes a presence detector for detecting a presence of the interfering object located forwardly in the travel direction of the article transport vehicle, and an auxiliary travel controller which controls operation of the travel actuating device based on the detected information from the presence detector, and
the auxiliary travel controller is configured to change the travel speed of the article transport vehicle from the normal travel speed to a reduced travel speed which is less than the normal travel speed if and when the interfering object is detected by the presence detector while the target travel speed is set to the normal travel speed.

16. The article transport facility as defined in claim 15, wherein the low speed area is defined to be a fan-shaped area whose radius is equal to a low speed distance defined in advance and which has a center at the position of the article transport vehicle and spreads forwardly of the article transport vehicle in plan view, and
wherein the external managing device is configured to transmit the deceleration command to the article transport vehicle if and when a distance from the article transport vehicle to the interfering object becomes less than or equal to the low speed distance.

17. The article transport facility as defined in claim 15, wherein provided as the position detector are a large area detector for detecting the position of the interfering object in an entire area of the detection target area, and a small area detector for detecting the position of the interfering object in an area in the detection target area in which detecting the position of an interfering object with the large area detector is difficult.

18. The article transport facility as defined in claim 15, wherein the vehicle side travel controller is configured to change the normal travel speed to a lower speed based on a travel condition, and to maintain the target travel speed at the normal travel speed even if the deceleration command is issued from the ground side travel controller while the target travel speed is set to the normal travel speed if the normal travel speed is less than the reduced travel speed.

19. The article transport facility as defined in claim 15, wherein the position detector is configured to transmit interfering object presence information to the presence detector if and when the distance from the article transport vehicle to the interfering object becomes less than or equal to a deceleration distance defined in advance, based on position information of the detected interfering object and travel position information for the article transport vehicle, and
wherein the presence detector is configured to be changed to a detection state in which a presence of the interfering object is detected, upon receiving the interfering object presence information from the said position detector.

20. The article transport facility as defined in claim 15, wherein the external managing device is configured to be able to determine a kind of interfering object based on detected information from the position detector, and to set a predefined low speed distance differently depending on the kind of interfering object.

21. The article transport facility according to claim 15, wherein:
- the article transport vehicle includes a presence detector for detecting a presence of the interfering object located forwardly in the travel direction of the article transport vehicle,
- the vehicle side travel controller is configured to change the travel speed of the article transport vehicle from the normal travel speed to a reduced travel speed which is less than the normal travel speed if and when an interfering object is detected by the presence detector while the target travel speed is set to the normal travel speed, and
- the position detector is configured to detect an interfering object at a position where it is difficult to detect the interfering object with the presence detector.

22. The article transport facility as defined in claim 15, wherein the external managing device is configured to be able to set a low speed distance defined in advance for when the interfering object is located forwardly of the article transport vehicle in the travel direction to be different from the low speed distance defined in advance for when the interfering object is located rearwardly of the article transport vehicle in the travel direction.

* * * * *